KENNETH M. GAVER
DERK V. TIESZEN
ESTHER P. LASURE
INVENTORS

Patented Sept. 2, 1952

2,609,370

BEST AVAILABLE COPY

UNITED STATES PATENT OFFICE 2,609,370

PROCESSES FOR THE PRODUCTION OF NEW CARBOHYDRATE COMPOUNDS

Kenneth M. Gaver and Esther P. Lasure, Columbus, Ohio, and Derk V. Tieszen, Delmar, N. Y., assignors to Ohio State University Research Foundation, Columbus, Ohio, a corporation of Ohio Application August 31, 1946, Serial No. 694,328

24 Claims. (Cl. 260—233.3)

The inventions disclosed in this application relate to new compositions of matter or compounds and to new processes for the formation of a large number of such new, compounds which have been heretofore unknown. The processes described herein illustrating our invention are especially designed to produce new products from starch and ordinarily include as one of the steps the hydrolysis of an intermediate compound to produce a glucoside, a glucose, or similar compound.

In carrying out preferred embodiments of our process, we produce as intermediate products certain new compounds which we have discovered and synthesized by our processes; these intermediate products in the nature of alcoholates of starch. To designate these compounds, we have coined the word "starchate" which we define as follows: "Starchate" means and is used in this specification and in the claims hereof in the sense of a compound composed of an undetermined number of polymerized gluco-pyranose units wherein one or more metallic atoms or inorganic or organic radicals are substituted for the hydrogen atoms of one or more of the several hydroxyl groups of the starch unit so as to form a polymerized compound which in fact is (or is at least analogous to) an alcoholate of starch.

Prior to our inventions disclosed herein, a certain process had been discovered for the substitution of alkaline metals in the starch molecule to form a starchate which we will refer to hereinafter as the ammonia process and the ammonia process starchate. As demonstrated in co-pending application Serial No. 357,995, now abandoned, and in the continuation thereof Serial No. 707,318, now Patent No. 2,518,135, and as demonstrated hereafter in this application, such prior art processes produce starchates which differ essentially from many of the starchates disclosed as intermediate products in this application. Also, in co-pending application Serial No. 357,995, now abandoned, and in the continuation thereof Serial No. 707,318, now Patent No. 2,518,135, there is disclosed the formation of a monosodium starchate and other monoalkali starchates and monometallic and monoorganic derivatives thereof, but as was demonstrated in said prior applications and as will be demonstrated hereafter herein such starchates also differ from the "ammonia process starchates" and from the polysubstituted starchates described herein.

Also, according to prior art methods, mono and polysubstituted products of cellulose and of simple sugars had been prepared, as for example, as described in Scherer and Hussey, Journal of American Chemical Society, 53: 2344 (1931); Schorigin et al., Berichte 69: 1713 (1936); Peterson and Barry, U. S. Patent 2,157,083, 1939; unknown British Patent 463,056 (1937); Muskat, Journal of American Chemical Society, 56: 693 (1934); and Muskat, Journal of American Chemical Society, 56: 2449 (1934). As will be demonstrated hereafter in this application, these substituted products of cellulose and of sugars are different from the products produced by our improved process. Referring again to the prior art process designated above as the "ammonia process," it may be noted that Schmid et al., (Chemical Abstracts 20: 744 (1926) and Chem. Cent. 2: 1761 (1928)) produced a monoalkyl derivative of starch by treating the starch with an alkali metal in liquid ammonia. Either as a final product or as an intermediate product these investigators obtained a monoalkali compound in which it was concluded that the reaction occurred on the six position carbon in the glucose unit of the starch molecule. Other investigators obtained sodium hydroxide adsorption compounds by dissolving starch in aqueous alkali followed by alcohol precipitation or by treating starch with alkali metal alcoholates. These compounds, however, were not starchates in that the alkali metal did not enter into the starch molecule.

Likewise, if glycogen, inulin, etc. are treated in liquid ammonia with an alkali metal, a monoalkali derivative as formed which is similar to the ammonia process starchates referred in the last paragraph. This monoalkali derivative differs essentially from the monoalkali derivative formed in the process described in application Serial No. 357,995 and the continuation thereof in that the alkali metal in such ammonia process starchates is attached to the No. 6 carbon atom whereas in the monoalkali starchate described in such prior application and described herein in connection with many of the processes of our present inventions is one in which the alkali metal is attached to the No. 2 carbon atom.

Heretofore as stated above, it has been possible by known processes to form compounds in which metallic and non-metallic elements, organic radicals and/or other groups are substituted for one or more hydrogen atoms of one of the hydroxyl groups of a glucose or similar sugar. However, in the prior art processes dealing with starch it has not been possible heretofore to accurately predetermine on which of the hydroxyl groups these substituted groups might be placed nor has it been possible to form compounds in which selected predetermined groups are substituted on the various hydroxyl carbon atoms nor to form compounds which have one group substituted on one carbon atom, a second group on a second carbon atom and a third group on a third carbon atom. We can, by our new processes, form such compounds.

One of the objects of our invention is the provision of new and useful processes of forming new and useful carbohydrates from starch.

A further object of our invention is the provision of new and useful processes for forming various new products from starch.

A further object of our invention is the provision of new and useful processes for forming various new and old glucoses and glucosides.

A further object of our invention is the provision of a new and useful process of forming polysubstituted products from starch.

A further object of our invention is the provision of new and useful products formed from starch.

Further objects and features of our invention will be apparent from a reading of the subjoined specification and claims when considered in connection with the accompanying drawings showing several exemplary processes illustrating certain embodiments of our inventions.

Figure 1:
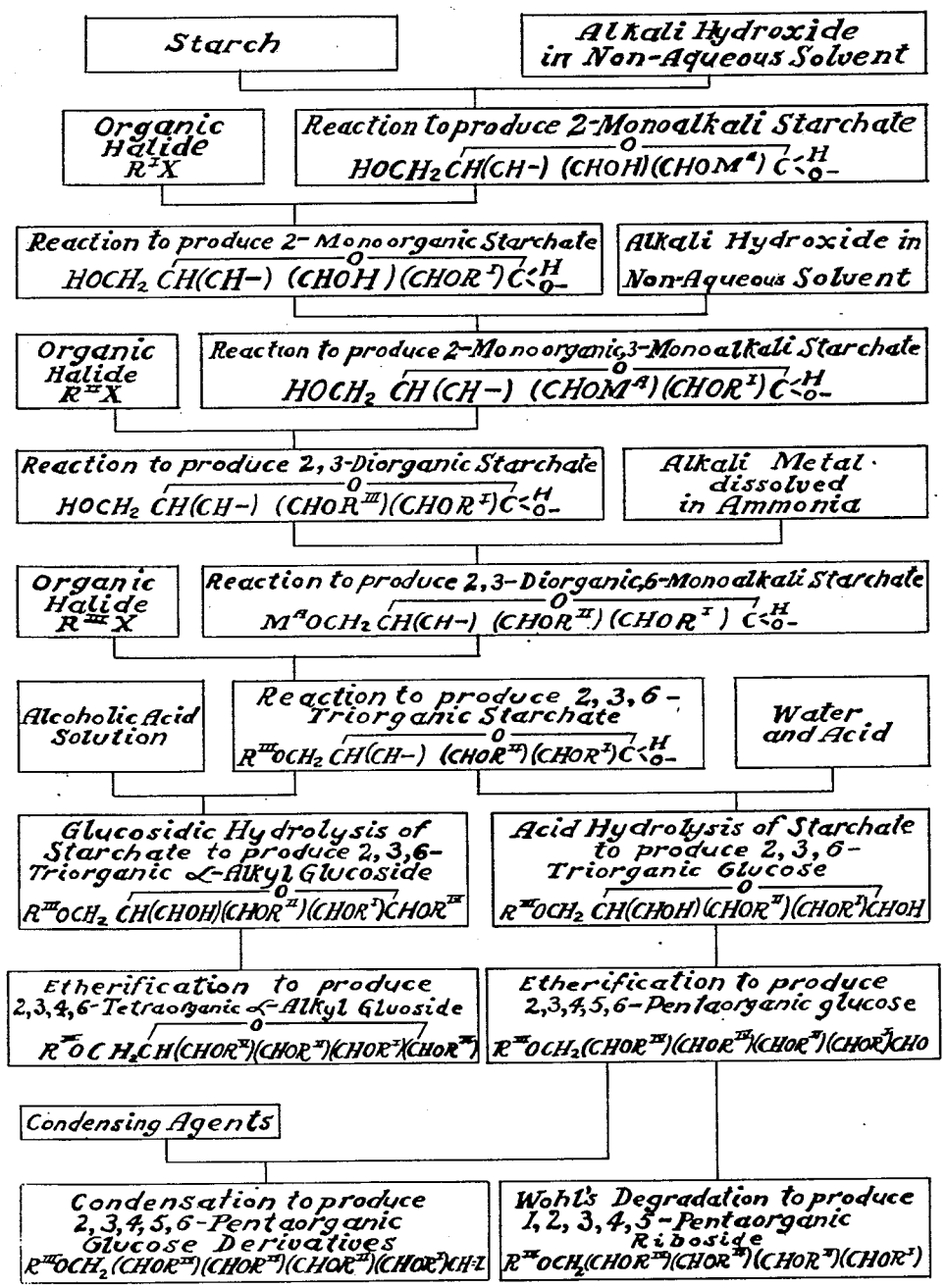
Fig. 1 is a diagram illustrating a process of forming monoalkali starchates, monoorganic starchates, starchates having one or more organic radicals and an alkali group substituted on the same glucopyranose unit, polyorganic starchates, glucoses, glucosides, glucose derivatives, and glucoside derivatives.

In co-pending application Serial No. 357,995 and in the continuations thereof, there are disclosed inventions relating to monometallic starchates (both alkali and nonalkali), to monoorganic starchates, and to methods for their preparation. In other co-pending applications we will disclose polyalkali metal starchates, polymetallic starchates (nonalkali), and mono and poly organic starchates (sometimes called starch ethers); and we reserve for claiming in such co-pending applications the inventions relating to such processes and products. The claims of this application will be directed to the combination processes for producing hydrolysis products of the various starchates produced by our improved processes and to the products produced thereby. These hydrolysis products naturally fall largely into the classes of glucoses and glucosides. As will subsequently be demonstrated herein, the number of these new glucose and glucoside products almost staggers the imagination. Most of these thousands of products have never heretofore been produced either naturally or synthetically.

CO-PENDING APPLICATION DISCLOSURE

*Monosubstituted starchates*

In co-pending application Serial No. 357,995 and in the continuation thereof, there are disclosed inventions relating to monoalkali metal starchates, methods for their preparation, and derivatives thereof. The inventions so disclosed are based upon the discovery that when starch is reacted with alcohol soluble hydroxides (such as the hydroxides of lithium, sodium, potassium, rubidium and caesium) under certain conditions there is produced a metallic starchate wherein the alkali metal is attached through an oxygen atom to a carbon atom in the complex-glucopyranose residue (the structure commonly considered as the building unit of starch).

The starchate product formed is a gluco-pyranose compound. The structural formula of the unit forming the building unit of the complex starchate may be illustrated as follows wherein $M^A$ represents an alkali metal:

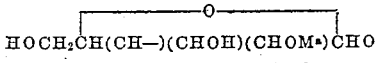

This product we will designate hereinafter in this application as a 2-monoalkali starchate. It was discovered that when such 2-monoalkali starchate is dissolved in water, a limpid solution results which may be neutralized and a starch product recovered by precipitation with alcohol. This may be filtered, washed, dried, and ground. This product is entirely different from the original starch in that it is water soluble, yielding a filterable, non-reducing, faintly cloudy solution called starch hydrol. However, a solution of starch in an aqueous sodium hydroxide of identical concentration results in a gel which when treated in identical manner yields a rubbery, water insoluble product resembling somewhat the original starch. If, however, the gel resulting from solution of the starch in aqueous sodium hydroxide is allowed to stand at room temperature for a period of two or more months' time, a thin limpid solution results which is similar in properties to the solution resulting from dissolving of 2-monoalkali starchate in water. Heating of the alkaline solution causes the well known alkaline degradation.

It has been known commonly heretofore that starch may be modified by treatment with aqueous solutions of alkalies, alkaline salts, alkaline earth hydroxides, and other hydroxides to produce starch products wherein a certain amount of the alkali, alkaline salts, alkaline earth hydroxide or other hydroxides is absorbed on the oxygen bridges within the building units (i. e. on the 1,5-pyranose ring) replacing the coordinated water in an equimolecular proportion. It has long been known that water as such was a natural constituent of the starch molecule and thermal decomposition data indicates that this water is present as coordinated water. It is generally accepted that this coordinated water is positioned on the oxygen bridge of the 1,5-pyranose ring. Treatment in aqueous media with various metallic hydroxides is conducive to ion exchange whereby the metallic hydroxide replaces the water of coordination. Various coordinated compounds have been reported as having compositions represented by the following formulae:

(1) $C_{12}H_{20}O_{10}.NaOH$
(2) $2C_{12}H_{20}O_{10}.NaOH$
(3) $3C_{12}H_{20}O_{10}.NaOH$
(4) $C_{12}H_{20}O_{10}.Ba(OH)_2$
(5) $2C_{12}H_{20}O_{10}.Ba(OH)_2$
(6) $3C_{12}H_{20}O_{10}.Ba(OH)_2$

Similar compounds of beryllium, calcium, strontium, magnesium, zinc, aluminum, copper, iron and lead either alone or in combination with other metals have been reported. The inability of the various investigators to make these compounds undergo the Williamson ether reaction is proof of their coordinated nature whereas our 2-monoalkali metal starchates readily undergo the Williamson ether reaction.

Obviously, in all these cases, the products formed in the above mentioned prior art processes were not compounds in the strictest sense but rather coordinated complexes of poorly defined nature. The disclosure of the inventions claimed and described in said co-pending applications and herein show that where starch is reacted according to our new processes and preferably by refluxing with an alcoholic solution of alkali hydroxide (i. e. one containing 8 to 14% NaOH or its equivalent) for a sufficient time and under controlled conditions, an alkali metal starchate compound (2-monoalkali metal starchate) is formed, which contains 15.5 to 16.5% NaOH or its equivalent in the case of cereal starches (e. g. rice) and from 19.3 to 19.8% NaOH or its equivalent in the case of root starches (e. g. potato).

Investigation of the 2-monoalkali metal starchate (when tested by titration and chemical reactions) definitely proves that the starch derivative formed is not an addition or coordinated compound but is a true alcoholate of starch. This is further borne out in that the 2-monoalkali, metal starchates (particularly the sodium or potassium starchates) produced have been found to be adapted as disclosed herein for use as starting compounds in making other metallic derivatives, ethers, esters, and other typical compounds using non-aqueous reaction medium.

One of the most outstanding characteristics of the 2-monosodium starchate made according to the inventions being considered is that it possesses a very low viscosity as compared with a simple solution of starch in sodium hydroxide. The products formed by the mere addition of sodium hydroxide to starch do not show this low viscosity. Further it is found that the surface tension of water is lower when a 2-monosodium starchate product is introduced. The iodine coloration also changes from blue to red upon the formation of such 2-monosodium starchate. Aqueous solution of such 2-monosodium starchate having increased quantities of combined sodium hydroxide are filterable to an extent which is unexpected. This is in direct contrast to conventional solutions of starch and alkali.

In preparing the 2-monoalkali starchates referred to above, we have investigated the effect of the following factors on the reaction.

*Temperatures*

Any temperature from 80° C. up to 115° C. in an open or closed system, which permits the volatilization of the water produced in the reaction produces 2-monosodium starchate. If the system is closed so that the water evolved in the reaction is retained in the reaction mixture, then the reaction will yield 2-monosodium starchate at any reasonable temperature above 80° C., i. e. up to the dextrinization temperature (unknown in non-aqueous solvents but perhaps to 200° C. or higher). Somewhere above 115° C., in an open system, other reactions occur and the product is no longer 2-monosodium starchate. Under strongly dehydrating conditions, e. g. with alcoholates, this reaction can be driven to completion at temperatures lower than 80° C.

*Pressure*

Apparently there is but very, very slight volume changes occurring in this reaction. Pressures up to 55 lbs. have been used with no effect on the course of the reaction or upon the product produced by the reaction. It is very probable that any practical pressure may be used provided the temperature and other requirements are not violated.

*Time of reaction*

The time of reaction varies with the solvent chosen. With ethyl alcohol any time beyond two hours does not alter the course of the reaction nor the character of the product. With butanol, the reaction is complete by the time the butanol (technical grade) reaches the boiling point of 115° C. A generalization may be made in that the reaction is completed within two hours at 80-81° C. or instantaneously at 115° C. or higher regardless of the nature of the solvent. Any temperature between 80° C. and 115° C. would require a proportionate reaction time (e. g. at 100° C. the time required is about 75 min. and at 110° C. the time required is about 15 min., etc.).

*Alkali concentration*

It has been repeatedly demonstrated that the reaction is independent of alkali concentration and the same product is always obtained provided there is sufficient alkali present to satisfy the requirements of the product. At the lower temperature range, i. e. 80° C., it is advisable to use an excess of alkali in order to complete the reaction in the two hour period. At the higher temperature range, i. e. 115° C., or higher only an amount of alkali approaching stoichiometric equivalent is necessary. The mother liquor from the latter reaction always shows a faint alkalinity approximating 0.04 N. This alkalinity apparently arises from the protein-alkali interaction product extracted from the starch. The protein is known to be extracted from the starch and appears in the mother liquor.

*Nature of the alkali*

Of the alkalies only ammonia failed to react. Sodium and potassium hydroxide, sodium methylate, sodium ethylate, sodium propylate and sodium butylate all yield chemically similar products. Any caustic alkali or alkaline reacting material having as ionization constant of $2 \times 10^{-5}$ or greater will react provided that it is more than very slightly soluble in the chosen reaction media and also provided that the molecular size of the reacting molecule is not too large to locate itself in position to react with the starch.

*Nature of the carbohydrate*

Similar reaction products were prepared using waxy rice, yucca, sago, arrowroot, sweet potato, potato, corn, wheat, tapioca and amioca starches; a series of thin boiling starches; wheat, potato, tapioca and corn dextrins; dextron; cotton;

linen; sucrose; α-methyl-glucoside; jute; ramie; cellulose; and inulin.

Reducing sugars react under similar conditions to produce ill defined sirups which analyze to be monosodium derivatives but which were not obtained in sufficient purity to be characterized.

Mechanism of the reaction

1. Water is evolved in the reaction and the amount of the water liberated is exactly chemically equivalent to the amount of alkali reacting with the starch to produce the 2-monoalkali starchate. The proven over-all reaction is $$(C_6H_{10}O_5) + NaOH \rightarrow (C_6H_9O_5Na) + H_2O$$

2. Starch readily adsorbs alkalies and such adsorption complexes were isolated and characterized by Karrer, Pringsheim and others. This was verified in our laboratory. At room temperature or even nearly up to 79° C., either in water, in alcohols or in other solvents exerting some solvent action towards alkalies the following reaction usually occurs:

$$(C_6H_{10}O_5) + NaOH \rightarrow (C_6H_{10}O_5.NaOH)$$

Such adsorbed alkalies are readily lost to give the adsorption compounds analyzing to be di-amylates, triamylates etc.

Portions of our inventions are based on the fact discovered by us that on heating, in a system which aids the removal of water either by dilution, by evaporation, or by reaction, this complex can be decomposed into the compound claimed and water as:

$$(C_6H_{10}O_5 \cdot NaOH) \xrightarrow{81°C.} (C_6H_9O_5Na) + H_2O$$

As stated above prior hereto this complex had been formed. However, no one had heretofore converted the complex to a starchate. In order to do so, it is necessary to separate the complex out of the solution (at least remove the water from the complex) and then in heating to 81° C., make provision for removal of water as stated above either by dilution, evaporation or reaction.

Dilution is obtained by using solvents; distillation or evaporation removes water from the reaction mixture; and reaction removes water by absorption. For example, by the use of sodium alcoholate the water is removed to produce more alcohol and alkali as:

$$NaOC_2H_5 + H_2O \rightarrow NaOH + C_2H_5OH \text{ etc.}$$

3. The position of reaction is on C-2. 2-monosodium starchate reacts easily with methyl iodide at temperatures of 80° C. or higher to yield 2-monomethyl starchate.

$$(C_6H_9O_5Na) + CH_3I \rightarrow (C_6H_9O_5CH_3) + NaI$$

This 2-monomethyl starchate may then be hydrolyzed to yield 2-monomethyl glucose.

$$(C_6H_9O_5CH_3) + H_2O \xrightarrow{H^+} C_6H_{11}O_6CH_3$$

Such sugar was characterized as follows:
1. No osazone reaction under usual conditions.
2. Phenyl hydrazone crystallized in needles, M. P. 176° C. and $(\alpha)_D = -12.4$ in pyridine which are the constants given in the literature for 2-monomethyl glucose phenyl hydrazone.
3. Crystalline monomethyl glucose melted at 157° C. and $(\alpha)_D = 66.0$ in water which are the constants given in literature for 2-monomethyl glucose.

No other sugar, methylated sugar or sugar derivative could be isolated from the hydrolysate. Crystalline products isolated accounted for 86.9% of the calculated quantity obtainable from the monomethyl starch. The obvious fact that the mother liquors still contained appreciable amounts of our product leads us to conclude that the reaction occurs on C-2 only.

4. Surprisingly enough the water formed in the reaction comes about as follows: The starch contributed the —OH and the NaOH contributed the H.

5. A substance analyzing to be monosodium starchate may be prepared using liquid ammonia and metallic sodium but this compound is different and distinct from the one heretofore described as is shown by the following:

1 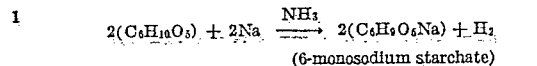
(6-monosodium starchate)

2 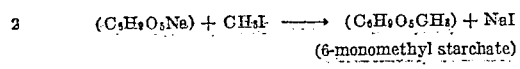
(6-monomethyl starchate)

3 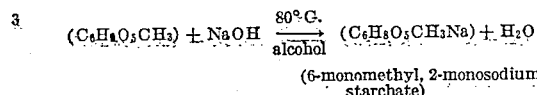
(6-monomethyl, 2-monosodium starchate)

4 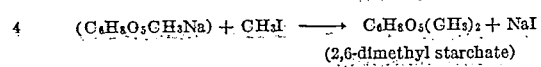
(2,6-dimethyl starchate)

5 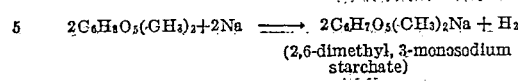
(2,6-dimethyl, 3-monosodium starchate)

6 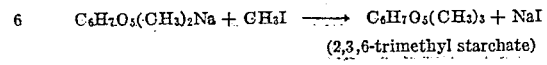
(2,3,6-trimethyl starchate)

Reaction 1 above goes only as indicated. In contrast to cellulose and other carbohydrates, starch yields only a monosodium starchate when treated with metallic sodium in liquid ammonia. The position occupied by the sodium was blocked in Reaction 2 so that it would not be available for reaction with the process previously described herein. However, when the product of Reaction 2 above was subjected to the reaction previously described herein, the same reaction proceeded smoothly and completely to its limit as indicated in Reaction 3 above. The position occupied by the sodium of Reaction 3 was blocked by methylation in Reaction 4. When the product was again subjected to metallic sodium in liquid ammonia (Reaction 5 above) a second hydroxyl group is reacted which when methylated yields a trimethyl starch in Reaction 6 above.

If, however, we reverse the order of above reactions we have:

1 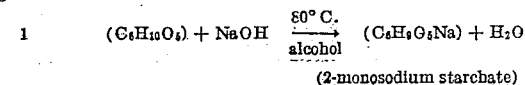
(2-monosodium starchate)

2 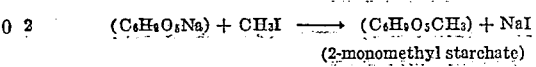
(2-monomethyl starchate)

3 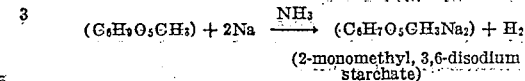
(2-monomethyl, 3,6-disodium starchate)

4 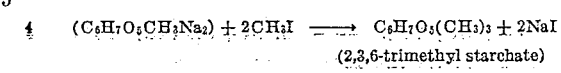
(2,3,6-trimethyl starchate)

It is obvious that the non-aqueous sodium hydroxide reaction is concerned with a position which is not involved in the reaction with metallic sodium and liquid ammonia.

The 2-alkali metal starchates made with alkali metal hydroxides as described above, undergo the Williamson ether reaction to form derivative products. The following typical products have been produced by us and are illustrative. In each case the 2-monosodium starchate used was made in accordance with the method described in said co-pending Gaver applications Serial No. 357,995 and Serial No. 707,318.

(a) Ethyl starchate
(b) Benzyl starchate
(c) Isoamyl starchate
(d) Butyl starchate
(e) Hydroxy ethyl starchate
(f) o-Chloro benzyl starchate An unpredictable number of other metallic starchates can be produced by starting with a 2-alkali metal starchate or an equivalent starchate compound and converting it by appropriate treatments. For example, by reacting a 2-monosodium starchate with a salt of the metal of which a starch derivative is desired various 2-metallic starchates are synthesized. When 2-monosodium starchate is chemically reacted with certain compounds there may be formed by double decomposition many other starch derivative products.

Thus as pointed out in the co-pending applications, an alkali metal atom can be substituted on the No. 2 carbon of the basic starch unit by reacting or treating, in approximately stoichiometric quantities, starch (or similar natural or synthetic carbohydrates) with an alkali or alkaline reacting material (having an ionization constant of $2 \times 10^{-5}$ or greater) in a solvent (containing enough of the alkali solution to produce 0.04 N or higher) at a temperature of 80° C. or higher (with or without agitation) for a period of two hours or longer. In such cases, a reaction will occur on the second carbon which will go practically to completion, provided alkali is present in sufficient quantity to permit one mole of alkali to react with one mole (162 grams) of starch. Under certain described exceptions, the temperature may be under 80° C. and under other described conditions the time may be under two hours.

HYDROLYZED ORGANIC STARCHATES

Referring now to the diagrams of the drawings and especially to Fig. 1 for a detailed description of some of the processes of our inventions, it may be seen that in the illustrated process, we react starch with an alkali hydroxide in a non-aqueous solvent as is fully described above. The alkali hydroxide may be sodium hydroxide, potassium hydroxide, rubidium hydroxide, caesium hydroxide or lithium hydroxide. Ammonia hydroxide is unsuitable. The non-aqueous solvent may be any solvent other than water which will dissolve sodium hydroxide to the extent of 0.04 N or higher. We have tested and found that the following solvents are all satisfactory and we have found no non-aqueous solvent which is unsatisfactory.

Solvents used

It has been found that any of the following alcohols may be used to prepare monosodium starchate provided that certain other variables are sufficiently controlled as will be discussed later. It must be understood that not all these mentioned have the same utility in the process. However, any solvent which will dissolve NaOH, even in small amounts, is a suitable vehicle in which to carry out the reaction provided that certain other variables are sufficiently controlled.

Alcohols which may be used

Allyl
Iso-amyl
n-Amyl
Sec.-amyl
Tert.-amyl
Anisyl
Benzhydrol
Benzoylcarbinol
Benzyl
2,3-butanediol
n-Butyl
Iso-butyl
Sec.-butyl
Tert.-butyl
Sec. butyl carbinol
β (p-tert. butyl phenoxy) ethyl
Capryl
Ceryl
Cetyl
3-chloro-2-propenol-1
Cinnamic
Crotyl
Cyclohexanol
Decyl
Diacetone
Diethyl carbinol
Dimethyl benzyl carbinol
Dimethyl ethynyl carbinol
Dimethyl n-propyl carbinol
Dimethyl isopropyl carbinol
Di-n-propyl carbinol
Di-iso-propyl carbinol
Ethyl
2-ethyl butyl
2-ethyl hexanol
Furfuryl
n-Heptyl
n-Hexyl
Sec.-hexyl
Lauryl
Methallyl
Methyl
Methyl amyl
Methyl butyl carbinol
o-Methyl cyclohexanol
m-Methyl cyclohexanol
p-Methyl cyclohexanol
2-methyl pentanol-1
Methyl isopropyl carbinol
n-Nonyl
n-Octyl
Octanol-2
Phenyl-propyl
n-Propyl
Iso-propyl
Tetrahydrofurfuryl
Triethyl carbinol
Triphenyl carbinol

Various polyhydric alcohols which may also be used

Ethylene glycol
Ethylene glycol monomethyl ether
Ethylene glycol monoethyl ether
Ethylene glycol monobenzyl ether
Ethylene glycol monobutyl ether
Diethylene glycol
Diethylene glycol monomethyl ether
Diethylene glycol monoethyl ether
Diethylene glycol monobenzyl ether
Diethylene glycol monobutyl ether
Di-propylene glycol
Glycerol
Glycerol α-n-butyl ether
Glycerol α,α' - dimethyl ether
Glycerol α,γ - diphenyl ether
Glycerol α-monomethyl ether
Hexamethylene glycol
2 - methyl - 2,4 - pentanediol
Propylene glycol
Triethylene glycol
Trimethylene glycol It is clear therefore that all non-aqueous solvents capable of dissolving the alkali to an extent comparable with the dissolving of sodium hydroxide to the extent of 0.04 N or higher are satisfactory. Step one of the process illustrated in Fig. 1 thus produces a 2-monoalkali starchate having a formula:

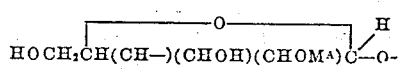

As a second step of the process disclosed in Fig. 1, we treat the 2-monoalkali starchate formed by step 1 above with an etherifying agent. We may suspend the starchate in from 1 to 10 times the calculated quantity of an etherifying agent and heat (with pressure, if desired) to 80–81° C. for from 2 to 24 hours. By this step we obtain a 2-monoorganic starchate having a formula:

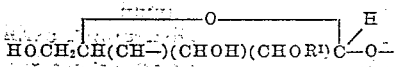

A dispersing solvent may be used if desired but is unnecessary. The reactants may be agitated or not, as desired. Pressure may be applied or not, as desired. The 2-monoalkali starchate may be treated in other manners with the organic compounds if desired. In the drawings, as examples we have designated these reactants as organic halides, but any organic compound containing a replaceable halogen or similarly reacting group is satisfactory. For instance, dimethyl sulfate, amyl nitrite, nitro paraffins, organic phosphates, acetates, benzoates, etc. are satisfactory. As further examples of the reactants which will react with the monoalkali metal or metallic starchate to produce the corresponding 2-mono-ethers of such carbohydrates, the following may be mentioned:

Acetodichlorohydrin
Allyl bromide
Allyl chloride
Allyl iodide
n-Amyl bromide
Iso-amyl bromide
Iso-amyl chloride
Tert.-amyl chloride
Amylene dichloride
Iso-amyl iodide
Benzalacetophenone dibromide
Benzal chloride
Benzotrichloride
Benzyl bromide
Benzyl chloride
Bromoacetic acid
ω-Bromoaceto-β-naphthone
α-Bromo-n-butyric acid
2-bromo-1-chloropropane
Bromocyclohexane
β-Bromoethyl ether
β-Bromoethyl phenyl ether
Bromoform
2-bromo-n-octane
p-Bromophenacyl bromide
Bromopicrin
α-Bromopropionic acid
β-Bromopropionic acid
γ-Bromopropyl phenyl ether
α-n-Valeric acid
α-Bromo-iso-valeric acid
n-Butyl bromide
Iso-butyl bromide
Sec.-butyl bromide Tert.-butyl bromide
n-Butyl chloride
Iso-butyl chloride
Sec.-butyl chloride
Tert.-butyl chloride
n-Butyl chloroacetate
Iso-butyl chlorocarbonate
α-Butylene bromide
β-Butylene bromide
Iso-butylene bromide
n-Butylidene chloride
n-Butyl iodide
Iso-butyl iodide
Sec. butyl iodide
Tert.-butyl iodide
Cetyl bromide
Cetyl iodide
Chloral
Chloroacetamide
Chloroacetdiethylamide
Chloroacetic acid
Chloroacetone
Chloroacetonitrile
Chlorobutane
β-Chlorobutyric acid
γ-Chlorobutyronitrile
Chlorocyclohexane
β-Chloroethyl acetate
β-Chloromethyl chlorocarbonate
Chloroform
Chloropicrin
α-Chloropropionic acid
β-Chloropropionic acid
β-Chloropropionitrile
γ-Chloropropyl chlorocarbonate
Decamethylene bromide α,β-Dibromobutyric acid
2,3-dibromopropene
α,β-Dibromopropionic acid
β,γ-Dibromopropyl alcohol
3,5-dibromopyridine
α,β-Dibromosuccinic acid
Dichloroacetic acid γ,γ'-Dichloropropyl ether
β,β'-Dichloroisopropyl ether
Epibromohydrin
Epichlorohydrin
Ethyl bromide
Ethyl bromacetate
Ethyl γ-bromo-n-butyrate Ethyl α-bromo-n-caproate
Ethyl bromomalonate
Ethyl α-bromopropionate
Ethyl β-bromopropionate
Ethyl α-bromo-isovalerate
Ethyl chloride
Ethyl chloroacetate
Ethyl α-chloroacetoacetate
Ethyl chlorocarbonate
Ethyl β-chloropropionate
Ethyl dibromoacetate
Ethyl dibromomalonate
Ethyl dichloroacetate
Ethylene bromohydrin
Ethylene bromide
Ethylene chloride
Ethylene chlorobromide
Ethylene chlorohydrin
Ethylidene bromide
Ethylidene chloride
Ethyl iodide
Ethyl trichloroacetate
Glycerol α,γ-dibromohydrin
Glycerol α,γ-dichlorohydrin
Glycerol α,β-dichlorohydrin
Glycerol α-monochlorohydrin Isopropyl bromide
n-Propyl chloride
Isopropyl chloride
Propylene bromide
Propylene bromohydrin
Propylene chloride
Propylene chlorobromide
Propylene chlorohydrin
s-Tetrabromoethane
s-Tetrachloroethane
Tetrachloroethylene
1,2,3-tribromo-2-Tribromoethylene
1,2,3-tribromo-2-methyl propane
1,2,3-tribromopropane
Trichloroacetic acid
Trichloro-tert.-butyl alcohol n-Heptyl bromide
n-Heptyl iodide
Hexachloroethane
Hexamethylene bromide
n-Hexyl bromide
n-Hexyl chlorocarbonate
n-Hexyl iodide
Iodoacetic acid
Iodoform
Lauryl bromide
Lauryl chloride
Methyl bromide
Methyl bromoacetate
Methyl β-bromopropionate
Methyl chloroacetate
Methyl chlorocarbonate
Methyl chloroform
Methyl α,β-dibromopropionate
Methyl α,β-dichloropropionate
Methylene bromide
Methylene chloride
Methylene iodide
Myristyl bromide
Methyl iodide
n-Nonyl bromide
n-Octadecyl bromide
n-Octadecyl chloride
Phenacyl bromide
Phenacyl chloride
n-Propyl bromide 2,2,3-trichlorobutyric acid
1,1,2-trichloroethane
Trichloroethylene
1,2,3-trichloropropane
Triglycol dichloride
Trimethylene bromide
Trimethylene bromohydrin
Trimethylene chloride
Trimethylene chlorobromide
Trimethylene chlorohydrin
Triphenylchloromethane
o-Xylyl bromide
m-Xylyl bromide
p-Xylyl bromide
o-Xylylene bromide
o-Xylylene chloride and similarly reacting chemicals including especially the esters.

The starchate may be dispersed with the organic compound in any suitable solvent. In addition to the solvents mentioned above, as solvents for the sodium hydroxides the following dispersing solvents may also be used:

Sec.-amyl benzene
Tert.-amyl benzene
Benzene
n-Butyl benzene
Sec.-butyl benzene
Tert.-butyl benzene
Cumene
Cyclohexane
2,7-dimethyl octane Ethyl cyclohexane
Heptane
Hexane
Hexadecane
Ligroin
Methyl cyclohexane
Nonane
n-Octane
Iso-octane

| | |
|---|---|
| n-Pentane | Trimethylethylene |
| Petroleum ether | 2,2,4-trimethyl pentane |
| Propyl benzene | |
| Tetraisobutylene | Triphenyl methane |
| Tetradecane | o-Xylene |
| Toluene | m-Xylene |
| Tri-isobutylene | p-Xylene |
| Trimethyl butane | | and various others.

The following ketones may also be used:

| | |
|---|---|
| Acetone | Methyl butyl |
| Acetophenone | o-Methyl cyclohexanone |
| Anisolacetone | |
| Benzalacetone | m-Methyl cyclohexanone |
| Benzophenone | |
| Benzoylacetone | p-Methyl cyclohexanone |
| Diethyl | |
| Diisopropyl | Methyl ethyl |
| Ethyl phenyl | Methyl hexyl |
| Ethyl undecyl | Methyl n-propyl |
| Methyl amyl | Methyl iso-propyl | and various others.

The following ethers may also be used:

| | |
|---|---|
| Allyl | Chloromethyl |
| Allyl ethyl | Dichloromethyl |
| n-Amyl | Diethylene glycol diethyl |
| Iso-amyl | |
| Anethole | Ethyl butyl |
| Anisole | Ethylene glycol dibenzyl |
| Benzyl | |
| Benzylmethyl | Ethylene glycol diethyl |
| n-Butyl benzyl | |
| n-Butyl | Ethyl |
| n-Butyl phenyl | Phenetole |
| 1,4-dioxane | n-Hexyl |
| Di-n-propyl | n-Propyl |
| Benzyl ethyl | Iso-propyl | and various others.

By these various lists we do not mean to exclude any other dispersing solvents.

As step three of the process shown in Fig. 1, we react 2-monoorganic starchate resulting from step two with an alkali hydroxide in a non-aqueous solvent in the same manner as in step one with the difference that the temperature is raised to 115° C. or higher and provision is made for the removal of water. The same solvents as are used in step one are suitable; the same alkali hydroxides are suitable. The alkaline reacting material should have an ionization constant of $2 \times 10^{-5}$ or greater in a solvent containing enough of the alkali in solution to produce 0.04 N or higher at a temperature of 115° C. There may be agitation or not as desired. The reaction should continue for a period of one hour or longer. There must however be a provision for removal of water formed in the reaction. This is most important and the provision for the removal of water together with the higher temperature distinguish this step from the requirements of step one. It is essential as stated that the water evolved in the reaction be removed as rapidly as formed and therefore only those alcohols boiling at 115° C. or more have any utility as solvents in the reaction except in special cases where some other means have been devised to remove the water. At 115° C. the water is removed by boiling or distillation. At temperatures below 115° C. special means must be provided for removing the water. This step of the process produces a 2-monoorganic, 3-monoalkali starchate, having a formula of

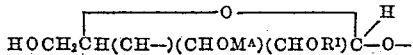

The fourth step of the illustrative process is similar to the second step. It comprises the reaction of the product of the third step with an organic reaction. This may be the same organic reactant as used in connection with the second step, or it may be a different organic reactant. It may be any one of the organic halides or similar reactants mentioned above in connection with step two. On treatment of the product, there is a reaction to produce a 2,3-diorganic starchate having a formula of

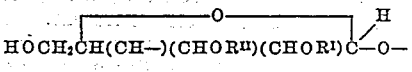

In this step, as in the preceding step, the temperature should be kept at 115° C. or higher and precautions should be taken to prevent water contamination.

The fifth step of the illustrative process comprises the reaction of the product of the fourth step with an alkali metal dissolved in ammonia. As pointed out above, this process which comprises the fifth step is a step known in the prior art. However, we combine it with the previous steps of this process and the combination becomes a new process because it involves a new combination of steps, some of which are old and some of which are new. Moreover, an entirely new product is obtained by this reaction. By it, we produce a 2,3-diorganic, 6-monoalkali starchate having a formula of

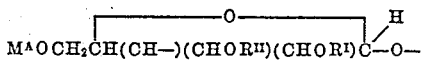

The sixth step of the illustrative process is similar to the second and fourth steps. In it we react the product of the fifth step with an organic reactant. This reactant may be the same as used in step two or the same as used in step four, or may be entirely different from the reactant used in those steps. By this sixth step reaction, we produce a 2,3,6-triorganic starchate having a formula of

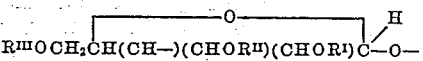

The seventh step of the illustrative process comprises the treatment of the 2,3,6-triorganic starchate produced in the sixth step with an alcoholic acid solution to obtain a 2,3,6-triorganic, α-alkyl glucoside having a formula of

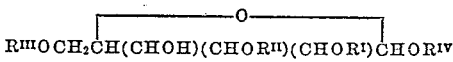

This glucoside hydrolysis of the starchate is somewhat similar to the glucosidic hydrolysis of starch according to the prior art. However, we combine this step with the preceding new and old steps of our process into a new combination of steps. By this entirely new combination process we produce entirely new products.

The eighth step illustrated comprises an etherification of the product of the seventh step to produce a 2,3,4,6-tetra-organic, α-alkyl glucoside having a formula of

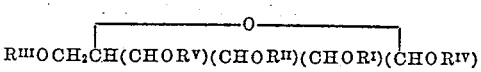

A process analogous to any one of several of the prior art processes may be used in this step in combination with our other new and old steps. For instance, prior to our invention starch has been methylated (1) by the use of methyl iodide and silver oxide, (2) by the use of di-methyl sulphate and sodium hydroxide, (3) by the use of dimethyl sulphate and barium hydroxide and (4) by the use of diazomethane. Such prior art processes are not selective but on the contrary etherify the carbon atoms indiscriminately. Similar processes however may be and are used by us to etherify the glucosides to substitute any desired organic radical on the unreacted hydroxyl groups.

So far we have described only one particular type of the processes disclosed herein. We will describe other types. We pause here, however, to give some further idea of the number of new products which may be synthesized by our new processes. The following discussion in this paragraph refers only to the number of products which may be synthesized by processes following the type of the process described above as constituting steps one to eight of the process disclosed in Fig. 1. The number of reactants listed above as suitable for reaction in steps two, four and six include approximately eighty derivatives of chlorine. Thus we have at least eighty organic radicals (actually there are a great many more) which may be substituted either as $R^I$, $R^{II}$ or $R^{III}$. Inasmuch as any one of the radicals may be substituted for $R^I$, there are eighty different compounds which may be synthesized by the first two steps. Inasmuch as any of the radicals may in each case be substituted as $R^{II}$ there are $(80)^2$ or 6400 compounds which may be synthesized by the first four steps. Inasmuch as any of these radicals may be substituted as $R^{III}$, there are 512,000 or $(80)^3$ compounds which may be synthesized by the first six steps. Thus carrying the process only through the sixth step enables us to produce approximately 500,000 new starchates. By means of the seventh step we are able to add onto the No. 1 carbon another organic radical. Inasmuch as this may be any organic radical which forms an organic alcohol, the number of new compounds possible by the utilization of the seven steps rises to a number of many million new compounds. Finally, by the eighth step we substitute for the hydrogen of the hydroxyl group on carbon number four, the same or another organic radical and the number of new compounds is multiplied again.

Nor is this even all. We have only been considering the glucosidic hydrolysis processes disclosed in Fig. 1. Fig. 1 discloses in addition to the process previously described other alternative processes for producing entirely different products than those previously considered. Figs. 2, 3, 4 and 5 disclose other processes. As will be pointed out there are also other processes disclosed but not specifically illustrated in the drawings.

For instance, instead of the glucosidic hydrolysis of the 2,3,6-triorganic starchates, we may, as is also shown in Fig. 1 treat the 2,3,6-triorganic starchate with water and an acid to effect an acid hydrolysis of the starchate to produce a 2,3,6-triorganic glucose having a formula of $$R^{III}OCH_2CH(CHOH)(CHOR^{II})(CHOR^{I})CHOH$$

We may then treat this 2,3,6-triorganic glucose to etherify it by the use of a process analagous to the above mentioned processes involving the use of (1) methyl iodide and silver oxide; (2) dimethyl sulfate and sodium hydroxide; (3) dimethyl sulfate and barium hydroxide; and (4) diazomethane. By such etherification we can produce a 2,3,4,5,6-pentaorganic glucose having a formula of

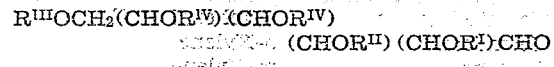
$$(CHOR^{II})(CHOR^{I})CHO$$

We may then condense this 2,3,4,5,6-pentaorganic glucose by the use of condensing agents to produce a large number of different 2,3,4,5,6-pentaorganic glucose derivatives having a formula of $R^{III}OCH_2(CHOR^{IV})(CHOR^{IV})$
$$(CHOR^{II})(CHOR^{I})CH=Z$$

Z being a condensed residue such as $=NNH_2C_6H_5$; $=NNH_2$; $=NH-CHOH$; and $=CNCHOH$.

Instead of condensing the 2,3,4,5,6-pentaorganic glucose, we may subject it to Wohl's degradation process to produce a 1,2,3,4,5-pentaorganic riboside having a formula of $$R^{III}OCH_2(CHOR^{IV})(CHOR^{IV})(CHOR^{II})(CHOR^{I})$$

We may also subject the glucoses and the various organic starchates of the processes illustrated in Fig. 1 to reactions such as esterification, oxidation, and reduction to produce still other compounds.

Figure 2:
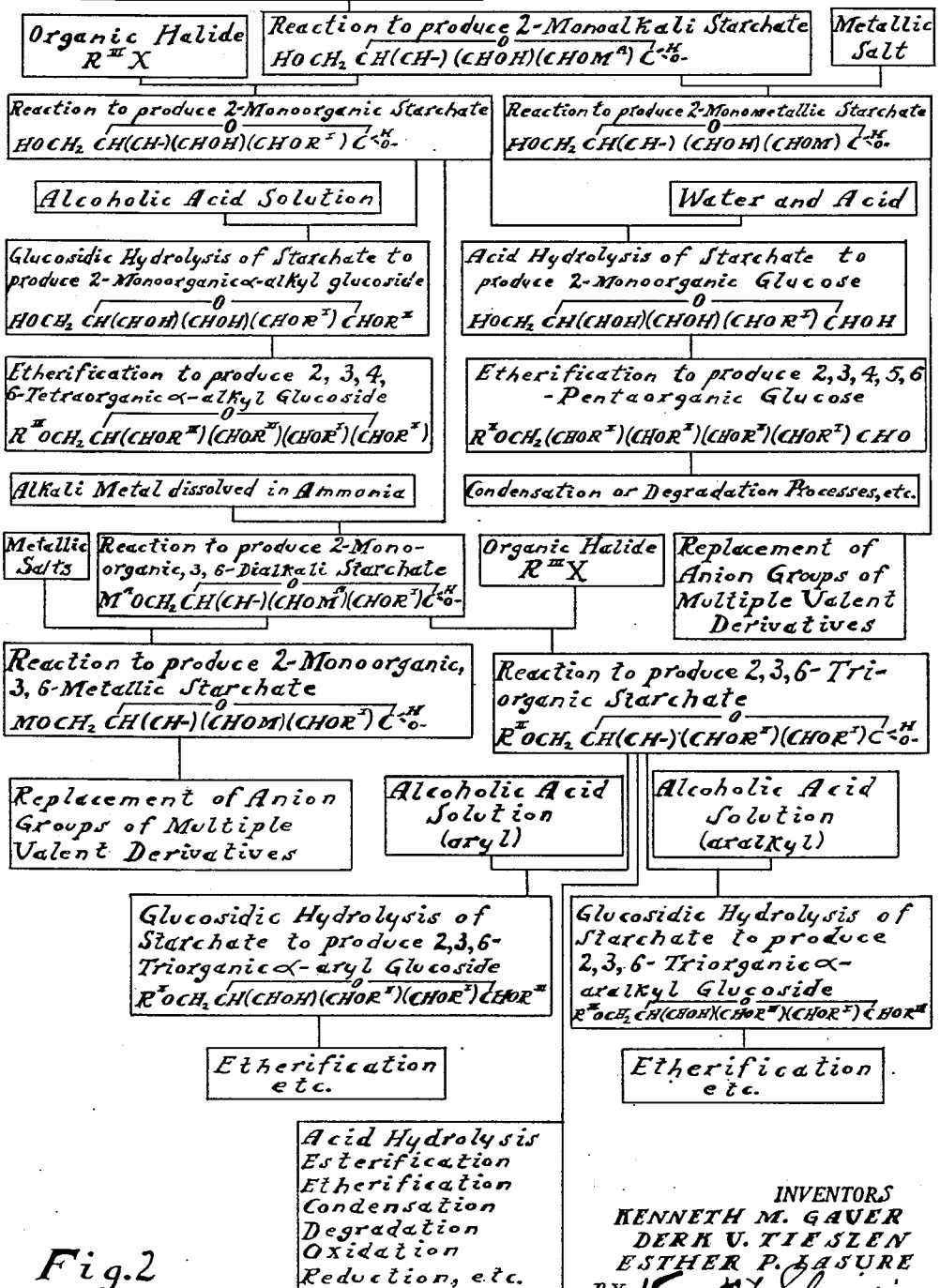
Fig. 2 is a similar diagram illustrating alternative processes to form the same and similar products and also illustrating alternative steps by which monoorganic glucoses and glucosides and their derivatives; and nonalkali monometallic starchates and mixed organic and metallic starchates and derivatives thereof may also be formed.

The processes indicated in Fig. 2 parallel to some extent those described in connection with Fig. 1. However, the order of the steps of the processes disclosed in Fig. 2 are different from the order of the steps disclosed in Fig. 1, so that some new and different products are obtained. Also, several other branch processes are disclosed. Thus, while some of the products obtained by the processes disclosed in Fig. 2 are the same as the products obtained by the processes of Fig. 1, still there are disclosed new processes for producing the same new compounds as well as new processes for producing many other compounds not produced by the processes described in connection with Fig. 1. As in the process described in connection with Fig. 1, the first step of the processes illustrated in Fig. 2 is the reaction of starch with an alkali hydroxide dissolved in an non-aqueous solvent to produce a 2-monoalkali starchate. This is exactly the same step as in the process described in Fig. 1. Moreover, the second step is also exactly the same and comprises the reaction of the 2-monoalkali starchate with an organic reactant to produce a 2-monoorganic starchate. From this product the main process indicated in Fig. 2, follows the line drawn down the center of the figure and comprises the reaction of the 2-monoorganic starchate with an alkali metal dissolved in ammonia to produce a 2-monoorganic 3,6-dialkali starchate having a formula of

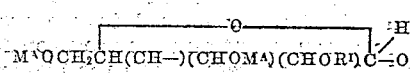

It will be noticed that this step three is similar to step five disclosed in Fig. 1. The result, however, is that the alkali metal is attached to both the No. 3 carbon atom and the No. 6 carbon with the result that the product of either step three is entirely different from the product of either step three or step five of the previously described process. Step four is the reaction of this product with an organic reactant to produce a 2,3,6-triorganic starchate having a formula of

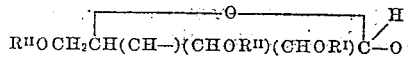

Although the designation of the organic radicals in the formula for this 2,3,6-triorganic starchate as shown in Fig. 2 differs from that of the 2,3,6-triorganic starchate produced by the first six steps of the process shown in Fig. 1 as is disclosed by a comparison of the formula, yet the product may be exactly the same, depending upon the choice of the organic reactant for reaction in steps two, four and six of the first process described, and for reaction in steps two and four of the processes described in connection with Fig. 2. Thus the products produced by this process may be produced by the process disclosed in Fig. 1, although the process differs because of the different order of the steps. Moreover, because in the process described in connection with Fig. 1, different organic groups may be placed on carbon 3 and carbon 6 a greater number of different organic starchates may be synthesized thereby than by the process in connection with Fig. 2. As explained in connection with Fig. 1, the 2-monoorganic starchates and the 2,3,6-triorganic starchates synthesized by the last described process may be further similarly reacted to produce other products by glucosidic hydrolysis, acid hydrolysis, esterification, etherification, condensation, degradation, oxidation, reduction and so forth.

Certain other processes according to our inventions, are also disclosed in Fig. 2. For instance, the 2-monoorganic starchates may be subjected to glucosidic hydrolysis, to produce 2-monoorganic, α-alkyl glucosides; 2-monoorganic, α-aryl glucosides and; 2-monoorganic, α-aralkyl glucosides (the aryl and aralkyl glucosides not being specifically designated in the figure) having formulas of

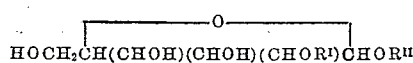

HOCH₂CH(CHOH)(CHOH)(CHOR¹)CHOR¹¹

These products are different from any previously described. They may be further etherified to produce a 2,3,4,6-tetraorganic glucoside having a formula of

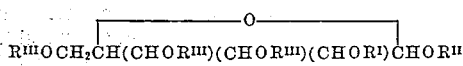

R¹¹¹OCH₂CH(CHOR¹¹¹)(CHOR¹¹¹)(CHOR¹)CHOR¹¹

While products of the same type as the last named glucoside may also be produced by main processes shown in either Fig. 1 or Fig. 2, yet the process last described is a different method of producing such products.

Another process disclosed in Fig. 2 is the acid hydrolysis of the 2-monoorganic starchate by the use of water and acid to produce a 2-monoorganic glucose having a formula of

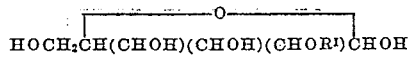

HOCH₂CH(CHOH)(CHOH)(CHOR¹)CHOH

This product also is a different product from any synthesized by the processes disclosed in Fig. 1. It may be further reacted by etherification to produce a 2,3,4,5,6-pentaorganic glucose having a formula of

R¹¹OCH₂(CHOR¹¹)(CHOR¹¹)

(CHOR¹¹)(CHOR¹)CHO

Although this formula appears different from the formula of the 2,3,4,5,6-pentaorganic glucose produced by the process of Fig. 1, yet the same products may also be produced by the process shown in Fig. 1 by etherification of the 2,3,6-triorganic glucose. The process disclosed in Fig. 2 may in some instances, where applicable, be a more economical process than that shown in Fig. 1 because of the elimination of some of the steps. This product may also be further reacted by condensation and degradation processes and so forth.

We also disclose in connection with Fig. 2 processes for substituting non-alkali metallic groups in certain of the starchates. For instance, we may react the 2-monoalkalistarchate with a metallic salt to produce a 2-monometallic starchate, it being understood that in the formulas shown in the figures, while M^A is used to indicate an alkali metal, M alone is used to indicate a non-alkali metal. Such a 2-monometallic starchate may be represented by the formula of

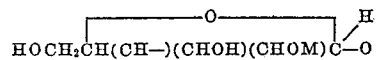

HOCH₂CH(CH—)(CHOH)(CHOM)C—O

Again the 2-monoorganic, 3,6-dialkali starchate produced by the third step of the main process disclosed in Fig. 2 may be reacted with a metallic salt to produce a 2-monoorganic, 3,6-dimetallic starchate having a formula of

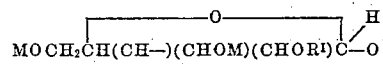

MOCH₂CH(CH—)(CHOM)(CHOR¹)C—O

Many of these metallic starchates may be further reacted to replace the anion groups of multiple valent derivatives. Fig. 2 also illustrates that any of the organic starchates of Figs. 1–5 inclusive, may be subjected to glucosidic hydrolysis by aryl or aralkyl alcoholic solutions as well as by alkyl alcoholic acid solutions. For instance the 2,3,6-triorganic starchate may be subjected to glucosidic hydrolysis to produce either a 2,3,4,6-tetraorganic α-aryl glucoside or a 2,3,4,6-tetraorganic α-aralkyl glucoside as shown in the figure.

Figure 3:
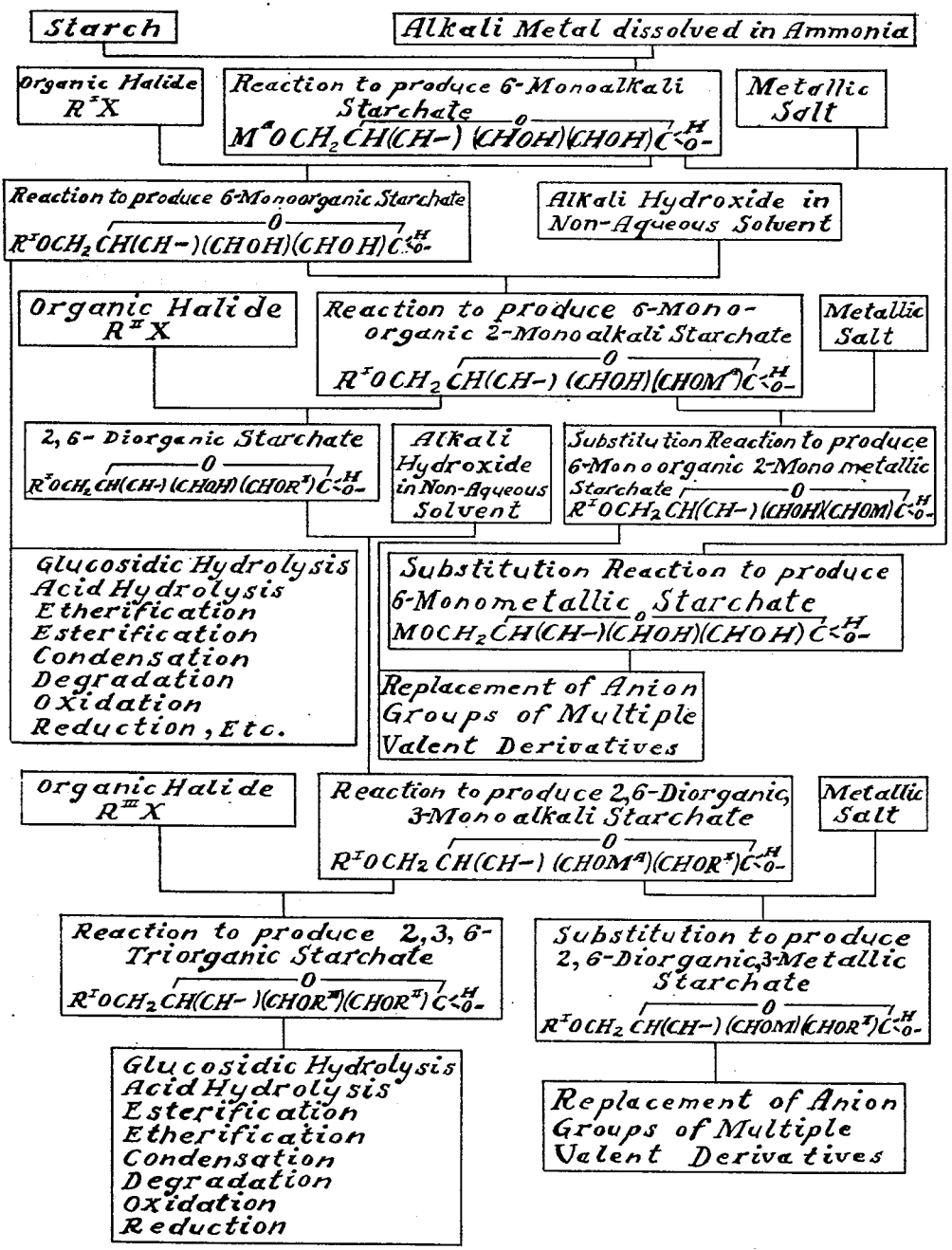
Fig. 3 is a similar diagram illustrating alternative similar processes for producing the same and similar products, the first step of which comprises the process of making ammonia process starchates.

In the processes disclosed in Fig. 3 the first step differs from the first step of the processes disclosed in Figs. 1 and 2. Although certain of the same end products may be produced either by the main process disclosed in Fig. 3 or by the main processes disclosed in Figs. 1 and 2, the processes themselves are different, some intermediate products are different and some alternative processes produce some different products. The processes of Figure 3 by reason of the change in the initial step are obviously different from the processes described in connection with Figs. 1 and 2. In the main process disclosed in Fig. 3 starch is reacted with an alkali metal dissolved in ammonia to produce a 6-monoalkali starchate having a formula of

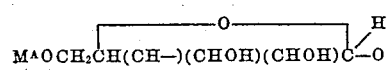

M^AOCH₂CH(CH—)(CHOH)(CHOH)C—O

This 6-monoalkali starchate is then reacted as previously described with an organic reactant to produce a 6-monoorganic starchate having a formula of

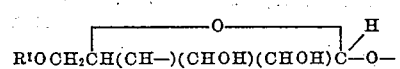

R¹OCH₂CH(CH—)(CHOH)(CHOH)C—O—

It may be noted that this 6-monoorganic starchate differs from the 2-monoorganic starchates produced by the processes disclosed in Figs. 1 and 2. This 6-monoorganic starchate is subsequently reacted with an alkali hydroxide in an non-aqueous solvent in the manner previously described in connection with the reaction of starch in step one of the processes previously described. This reaction produces a 6-monoorganic, 2-monoalkali starchate having a formula of

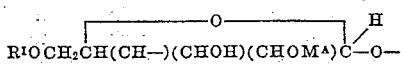

R¹OCH₂CH(CH—)(CHOH)(CHOM^A)C—O—

This starchate is similarly reacted with an organic reactant to produce a 2,6 - diorganic starchate having a formula of

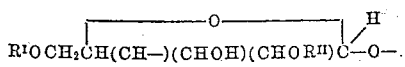

This 2,6-diorganic starchate is then reacted with an alkali hydroxide in a non-aqueous solvent. In this step, as stated above in connection with Fig. 1 and Fig. 2, it is necessary to take adequate precautions for the removal of water and against water contamination. The temperature must be raised to 115° C. or higher so that water is driven off by distillation or other provisions made for the removal of water. The product is a 2,6-diorganic, 3-monoalkali starchate having a formula of

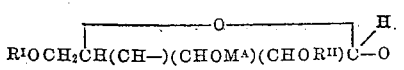

By reaction with an organic reactant as in the processes previously described a 2,3,6-triorganic starchate may be produced having a formula of

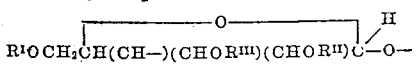

Although this formula may appear different from that of the products produced by the previously described processes, yet it may define exactly the same products produced by such different processes. This 2,3,6-triorganic starchate may, of course, be reacted by glucosidic hydrolysis, acid hydrolysis, esterification, etherification, condensation, degradation, oxidation, reductions and so forth.

The 6-monoorganic starchate and the 2,6-diorganic starchate may also be reacted by glucosidic hydrolysis, acid hydrolysis, etherification, esterification, condensation, degradation, oxidation, reduction and so forth to produce other compounds not previously mentioned. The 6-monoalkali starchate; the 6-monoorganic, 2-monoalkali starchate; and the 2,6-diorganic, 3-monoalkali starchates may be reacted with a metallic salt to produce corresponding monometallic starchates which may be further reacted by the replacement of the anion groups of multiple valent derivatives.

Figure 4:
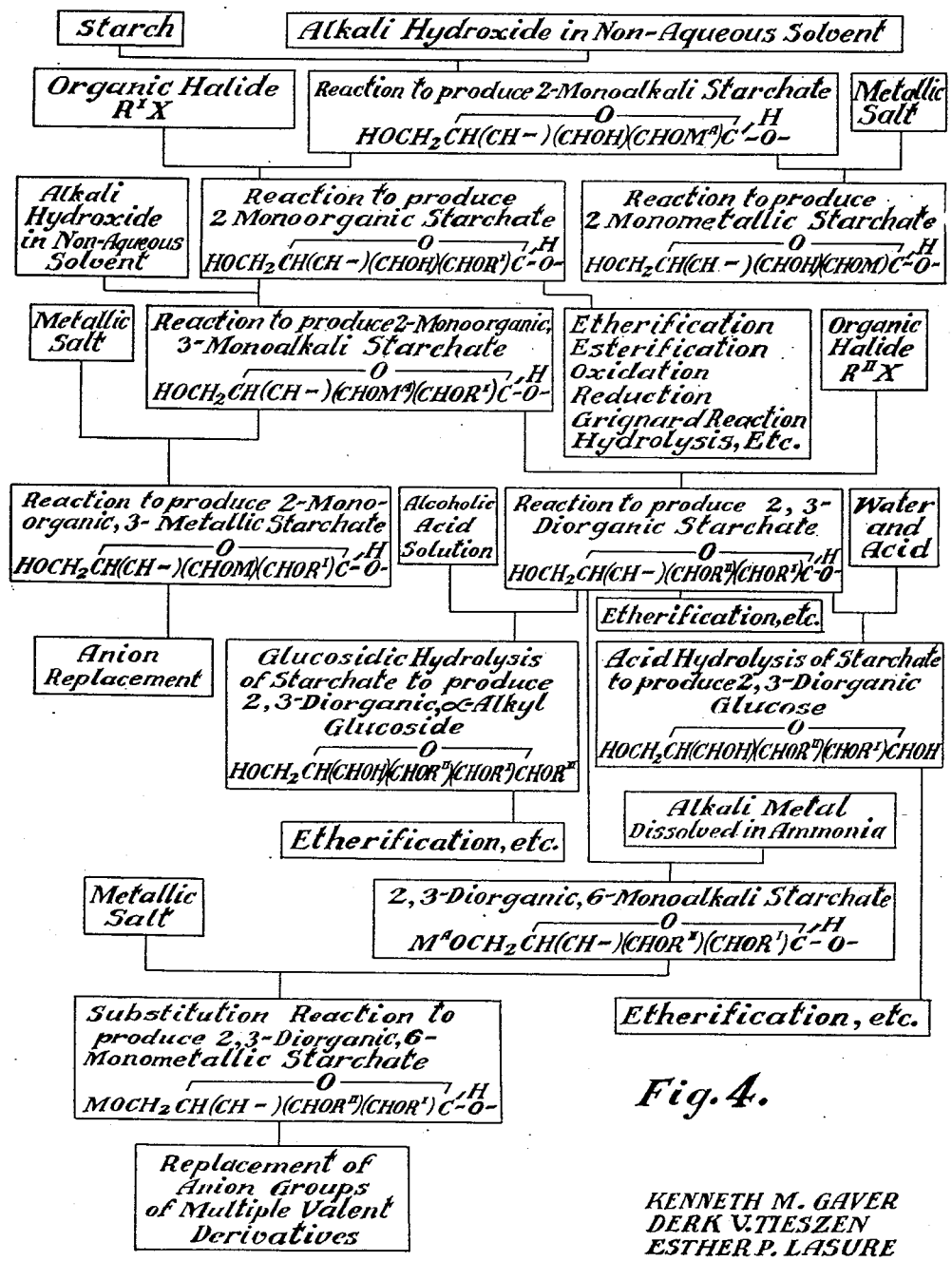
Fig. 4 is a similar diagram illustrating alternative processes for producing similar products and disclosing among other new processes, new processes of producing mono and diorganic glucoses and glucosides.

The processes disclosed in Fig. 4 are similar in many respects to those disclosed in the first portion of Fig. 1. That is to say, the first five steps of the main process shown in Fig. 4 are exactly the same as the first five steps of the process disclosed in Fig. 1. Thus starch is reacted with an alkali hydroxide in a non-aqueous solvent to produce a 2-monoalkali starchate. This 2-monoalkali starchate is converted by reaction with an organic compound to produce a 2-monoorganic starchate. This is reacted again with alkali hydroxide in a non-aqueous solvent at a higher temperature to produce a 2-monoorganic, 3-monoalkali starchate. This is reacted with an organic compound to produce a 2,3-diorganic starchate. This is reacted with an alkali metal dissolved in ammonia to produce a 2,3-diorganic, 6-monoalkali starchate having a formula of

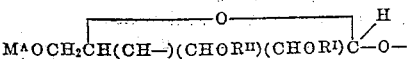

However, alternative processes disclosed in Fig. 4 are different from any of the processes previously disclosed in connection with Figs. 1, 2 and 3. Thus we show that the 2-monoalkali starchate may be reacted with a metal salt to produce a 2-monometallic starchate having a formula of

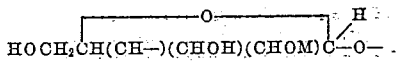

The 2-monoorganic, 3-monoalkali starchate may be reacted with a metallic salt to produce a 2-monoorganic, 3-metallic starchate having a formula of

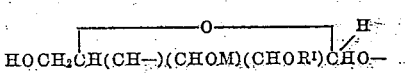

The 2,3-diorganic 6-monoalkali starchate may be reacted with a metallic salt to produce a 2,3-diorganic 6-metallic starchate having a formula of

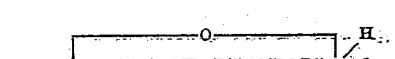

Any one of the above described monometallic starchates may then be reacted to effect replacement of anion groups of multiple valent derivatives.

The 2-monoorganic starchate; or the 2,3-diorganic starchate; may be etherified, esterified, oxidized, reduced, and/or subjected to a Grignard reaction and so forth to produce products which are entirely different from any possible under any prior art processes and many which are entirely different from any process described in connection with Figs. 1 to 3 inclusive.

The 2-monoorganic starchates may be subjected to glucosidic hydrolysis by alcoholic acid solutions to produce 2-monoorganic, α-alkyl glucosides, 2-monoorganic, α-aryl glucosides, or 2-monoorganic, α-aralkyl glucosides with a formula of

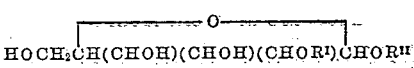

The 2,3-diorganic starchates may be subjected to glucosidic hydrolysis by alcoholic acid solutions to produce 2,3-diorganic, α-alkyl glucosides, 2,3-diorganic, α-aryl glucosides, or 2,3-diorganic, α-aralkyl glucosides with formulas of

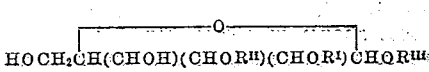

The 2-monoorganic starchates may be subjected to acid hydrolysis by the use of water and an acid to produce 2-monoorganic glucoses, having formulas of

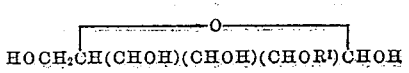

The 2,3-diorganic starchate may be subjected to acid hydrolysis by the use of water and an acid to produce 2,3-diorganic glucoses, having formulas of

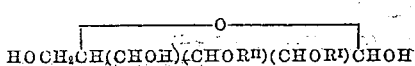

Figure 5:
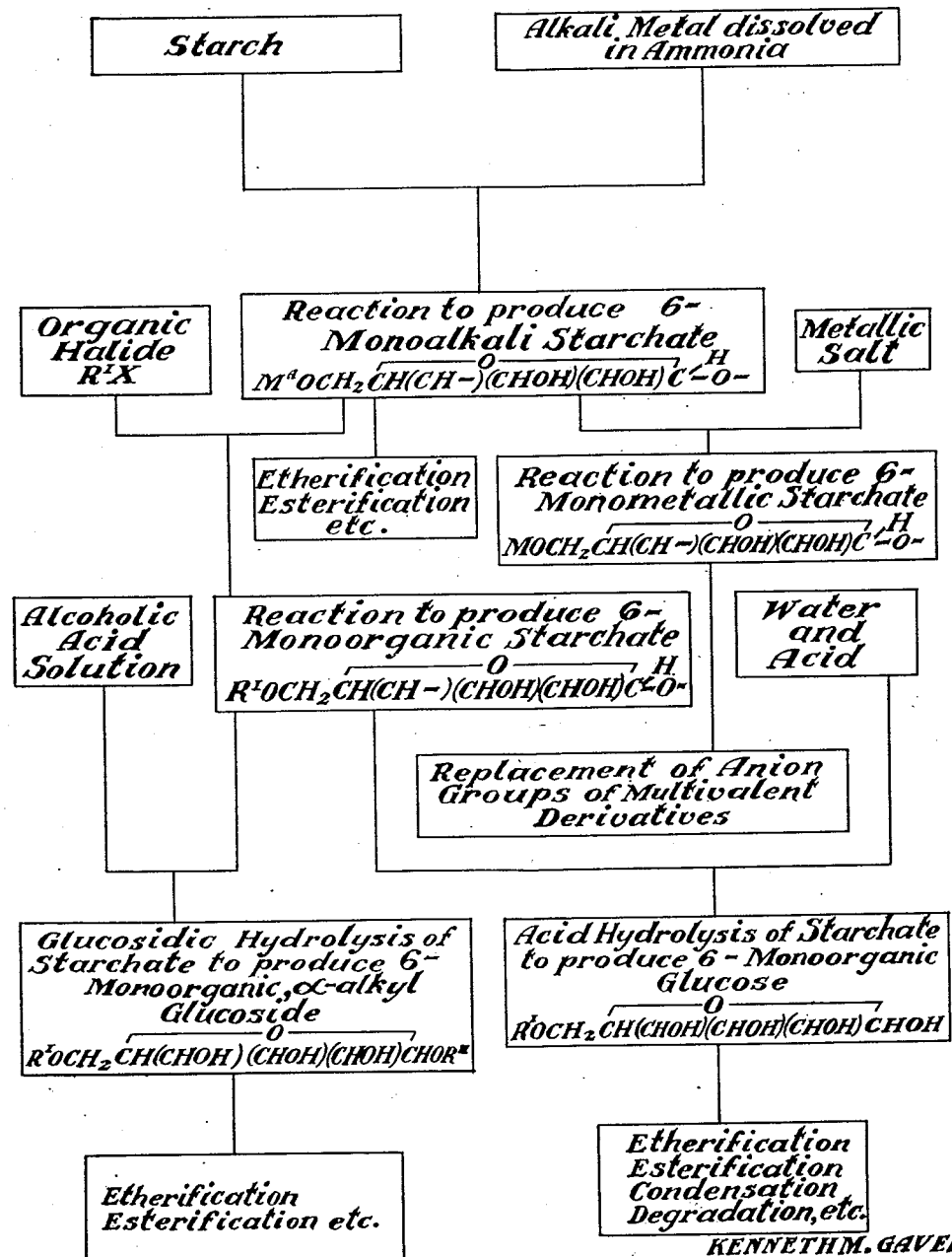
Fig. 5 is a similar diagram illustrating the process of producing 6-monoorganic glucoses and 6-monoorganic α-glucosides and derivatives thereof.

The first two steps of the main process disclosed in Fig. 5 are the same as the first two steps of the process described in connection with Fig. 3. Thus starch is reacted with an alkali metal dissolved in ammonia to produce a 6-monoalkali starchate and this 6-monoalkali starchate is then reacted with an organic reactant to produce a 6-monoorganic starchate. The 6-monoorganic starchates may be then subjected to glucosidic hydrolysis of the starchate to produce 6-monoorganic, α-alkyl glucosides (or 6-monoorganic, α-aryl glucosides, or 6-monoorganic, α-aralkyl glucosides) having formulas of

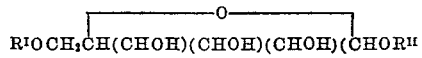
$$R^{I}OCH_2CH(CHOH)(CHOH)(CHOH)(CHOR^{II})$$

These glucosides may be then further reacted by etherification and so forth. Or the 6-monoorganic starchates may be reacted with water and acid to effect acid hydrolysis of the starchates to produce 6-monoorganic glucoses having formulas of

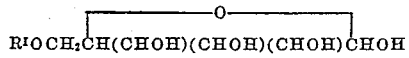
$$R^{I}OCH_2CH(CHOH)(CHOH)(CHOH)CHOH$$

These glucoses may be further reacted by etherification, condensation, degradation and so forth.

Moreover, the 6-monoalkali starchates may be reacted with a metallic salt to produce 6-monometallic starchates having formulas of

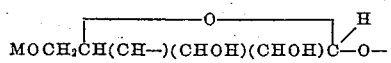
$$MOCH_2CH(CH-)(CHOH)(CHOH)\overset{H}{C}-O-$$

These 6-monometallic starchates may be further modified by the replacement of anion groups of multiple valent derivatives.

Above in connection with Figures 2, 3, 4 and 5 we have described the replacement of alkali metals with non-alkali metals by reaction of the alkali starchates with metal salts. In each of the cases specified we can, if we wish, use a non-metal inorganic salt as the reactant instead of a metal salt and obtain instead of the non-alkali metal starchates described in connection with said Figures 2, 3, 4 and 5 corresponding non-metal inorganic starchates. Thus in fact we can react the alkali metal starchates with any salt, organic or inorganic, metal or non-metal and obtain corresponding organic or inorganic, metal or non-metal starchates.

While the above are believed to cover the main processes involved in our invention disclosed herein, the following resume of the hydrolysis products of the starch ethers synthesized by our processes will be helpful.

We have described in this application methods of synthesizing the following types of starchates and starchate derivatives in connection with the figures indicated:

Alkali starchates:                    Figures of drawings
   2-monoalkali _____ 1, 2, 4
   6-monoalkali _____ 3, 5

Organic starchates:
   2-monoorganic _____ 1, 2, 4
   6-monoorganic _____ 3, 5
   2,3-diorganic _____ 1, 4
   2,6-diorganic _____ 3
   2,3,6-triorganic _____ 1, 2, 3

Inorganic non-alkali metal and non-metal starchates:
   2-monometallic _____ 2, 4
   6-monometallic _____ 3, 5
   Inorganic 2-mononon-metallic _____ 2, 4
   Inorganic 6-mononon-metallic _____ 3, 5

Mixed organic alkali starchates:
   2-monoorganic, 3-monoalkali _____ 1, 4
   2-monoorganic, 3,6-dialkali _____ 2
   2-monoalkali, 6-monoorganic _____ 3
   2,3-diorganic, 6-monoalkali _____ 1, 4
   2,6-diorganic, 3-monoalkali _____ 3

Mixed organic non-alkali metal starchates:
   2-monoorganic, 3-monometallic _____ 4
   2-monoorganic, 3,6-dimetallic _____ 2
   2-monometallic, 6-monoorganic _____ 3
   2,3-diorganic, 6-monometallic _____ 4
   2,6-diorganic, 3-monometallic _____ 3

Mixed organic inorganic non-metal starchates:
   2-monoorganic, 3-mononon-metallic __ 4
   2-monoorganic, 3,6-dinon-metallic __ 2
   2-mononon-metallic, 6-monoorganic __ 3
   2,3-diorganic, 6-mononon-metallic __ 4
   2,6-diorganic, 3-mononon-metallic __ 3

Glucosides:
   2-monoorganic, alkyl- _____ 2, 4
   2-monoorganic, aryl- _____ 4
   2-monoorganic, aralkyl- _____ 4
   6-monoorganic, alkyl- _____ 3, 5
   6-monoorganic, aryl- _____ 3
   6-monoorganic, aralkyl- _____ 3
   2,3-diorganic, alkyl- _____ 4
   2,3-diorganic, aryl- _____ 4
   2,3-diorganic, aralkyl- _____ 4
   2,6-diorganic, alkyl- _____ 3
   2,6-diorganic, aryl- _____ 3
   2,6-diorganic, aralkyl- _____ 3
   2,3,6-triorganic, alkyl- _____ 1
   2,3,6-triorganic, aryl- _____ 2
   2,3,6-inorganic aralkyl _____ 2
   2,3,4,6-tetraorganic, alkyl _____ 1, 2, 3
   2,3,4,6-tetraorganic, aryl- _____ 2, 3
   2,3,4,6-tetraorganic, aralkyl- _____ 2, 3

Glucoses:
   2-monoorganic _____ 2
   6-monoorganic _____ 3, 5
   2,3-diorganic _____ 4
   2,6-diorganic _____ 3
   2,3-triorganic _____ 1
   2,3,4,5,6-pentaorganic _____ 1, 2, 5

Glucose derivatives:
   Products of—Esterification, condensation, oxidation, reduction, and Wohl's degradation of glucoses shown above_____ 1, 2, 3, 4, 5

As was demonstrated previously herein (assuming a list of only eighty organic radicals available for reaction (i. e. substitution as $R^I$ $R^{II}$ $R^{III}$ $R^{IV}$ and $R^V$) it is clear that we have taught the synthesis of eighty 2-monoorganic starchates; eighty 6-monoorganic starchates; sixty-four hundred 2,3-diorganic starchates; sixty-four hundred 2,6-diorganic starchates; and five hundred twelve thousand 2,3,6-triorganic starchates. Each of these starchates may be hydrolyzed to glucosides which any alkyl, aryl or aralkyl alcohol acid solutions so that many million such glucosides may be synthesized. Each of the starchates may be hydrolyzed by an acid water solution to form an equal number of new glucoses. Each of these new glucoses may be etherified with any appropriate etherifying agent to synthesize many million new glucoses. Each of the monoorganic, diorganic and triorganic strachates listed above may be esterified, dehydrated, condensed, oxidized, reduced, subjected to Grignard reaction, and exhaustively etherified. The open hydroxyl groups of such starchates may also be reacted by the replacement of the hydrogen of the hydroxyl group by active metals, acid halides, organic acids, organic acid anhydrides, alkyl hydrogen sulfates, Grignard reagents or by the replacement of the hydroxyl group by hydiodic acid, hydrobromic acid, hydrochloric acid, sulfuric acid, nitric acid. For example, the hydroxyl groups of such organic starchates may be reacted by dehydration to produce unsaturated derivatives; by oxidation to give ketones; by condensation with aldehydes to give aldol-type products; by condensation with reagents reacting with aldehydes to produce another series of glucose derivatives. The aldehyde groups formed may be (1) oxidized to the carboxyl to form a series of substituted gluconic acids with their corresponding derivatives of salts, esters, amides, acid chlorides, anhydrides, lactones, and lactides, etc.; (2) reduced to a primary alcohol group giving another position (six in all) over which we have control; (3) reacted with Grignard reagents, hydrocyanic acid, sulfites, ammonia, etc. to produce another series of compounds; and (4) replaced by the substitution by halogens, hydroxylamine, hydrazine, phenyl-hydrazine, and various substituted hydrazines, etc.

From the above it will be clear that it is impossible to give examples of the synthesizing of all of the products possible by our improved process or even to give examples of all of the hundreds of products which we have actually synthesized.

Following are examples of the synthesis of various products by the use of processes of our invention.

Inasmuch as certain steps of the procedures involved in many of the examples were identical or substantially identical, we set out now a series of directions or procedures which are followed in performing such steps. These directions or procedures are designated as Procedures 1–13, inclusive and in each of the examples, we have merely stated that certain of these procedures were employed. Thereby we have not only reduced the work of writing out the examples but have also, we believe, presented the examples in a manner by which they may be more readily understood. Following are the thirteen procedures referred to:

PROCEDURE 1

*Preparation of 2-sodium starchate*

In a 1000 ml. three-necked flask fitted with an efficient agitator, a thermometer and a reflux condenser, place the following:

100 grams of starch
22 grams of sodium hydroxide
500 ml. butanol

Heat this mixture to 85° C. for 2 hours with vigorous agitation. Filter on suction, wash with butanol and then with toluene. The product, at this stage can be used directly in Procedure 4. The product may, however, be dried to produce 2-sodium starchate. The 2-sodium starchate must be protected from moisture and carbon dioxide during filtration, processing and drying. Drying can be best effected in a vacuum at temperatures below 100° C.

PROCEDURE 2

*Preparation of 2,3-disodium starchate (or 3-sodium starchate if C-2 is occupied by an organic radical)*

In a 1000 ml. Claisen flask fitted with an efficient agitator and a thermometer place the following:

100 grams of starch
40 grams of sodium hydroxide
750 ml. butanol

Slowly distil with vigorous agitation until the distillation temperature ceases to rise (or when the temperature reaches 118° C.). Filter hot with elaborate precautions to avoid contamination by moisture and wash twice with anhydrous butanol then with anhydrous toluene.

The product, at this stage, can be used directly in Procedure 4. The dry product is unstable.

If C-2 is occupied by R then the amount of sodium hydroxide should be cut to 20 grams.

PROCEDURE 3

*Preparation of 6-sodium starchate (or on any free hydroxyl group with the exception of native starch in which case it is only on C-6)*

In a 1000 ml. three-necked flask fitted with an efficient agitator, an ammonia inlet and a stopper, and immersed 2 inches in a Dry Ice-acetone bath, place the following:

Pass dry ammonia gas into the flask until 500 ml. of liquid ammonia have been condensed. Introduce 25 grams of dry starch which soon disperses in the liquid ammonia under the influence of agitation. Add sodium wire piece-wise until the mixture turns blue (3.5 to 3.7 grams). The excess sodium, indicated by the blue color, may be destroyed by small amounts of carbon dioxide.

The ammonia is removed by evaporation and the product may be used directly in Procedure 4.

PROCEDURE 4

*Etherification according to the reaction*

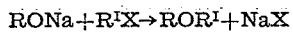

$$RONa + R^1X \rightarrow ROR^1 + NaX$$

The sodium starchate prepared according to Procedures 1, 2 or 3 is suspended in anhydrous toluene according to the following:

100 grams of starch (converted into the sodium starchate)
200 ml. toluene
100 ml. of the organic halide This mixture is placed in a 1000 ml. bomb (preferably glass lined), sealed tight and autoclaved at 100° C. for about four hours.

The supernatant liquid is decanted (or filtered) off and the product repeatedly extracted hot with anhydrous butanol to remove the NaX formed. This purified product is then washed with anhydrous toluene and then dried.

PROCEDURE 5

*Glucosidic hydrolysis*

In a 2000 ml. three-necked flask fitted with an efficient agitator, a thermometer and a reflux condenser, place the following: 1500 ml. anhydrous alcohol (according to the glucoside desired). Pass in dry HCl gas until the solution becomes 0.5% HCl and then add 100 grams starch (converted into the starch ether). Reflux with agitation until the optical rotation becomes constant (48 hours). The acidity of the solution should be checked periodically so that an acidity of 0.25 to 0.50% may be maintained. At the completion of the hydrolysis the solution is concentrated to about 300 ml. under vacuum. Any unetherified glucose will crystallize, as α-methyl glucoside, from this solution on cooling and can be removed by filtration.

The solution is further evaporated to a sirup and the desired glucoside can be separated from the sirup according to usual chemical procedures, i. e., extraction, crystallization or fractional precipitation etc.

The product obtained is purified by recrystallization in the usual manner.

PROCEDURE 6

Acid hydrolysis

In a 2000 ml. three-necked flask fitted with an efficient agitator, a thermometer and a reflux condenser place the following:

100 grams of starch (converted into the starch ether)
1500 ml. 0.5% HCl solution Reflux with agitation until the optical rotation becomes constant (48 to 72 hours).

At the completion of the hydrolysis, add 50 grams of silver oxides and the solution is concentrated under vacuum to a volume of 500 ml. and then filtered hot through a filter aid and decolorizing carbon.

The solution is then evaporated to a sirup and taken up in alcohol whereon the polyamyloses are precipitated. The alcohol solution is then evaporated and the substituted glucoses are crystallized or separated in the usual manner.

PROCEDURE 7

Etherification according to the reaction $$ROH + R^IX + NaOH \rightarrow ROR^I + NaX + H_2O$$

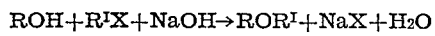

In a 1000 ml. three-necked flask fitted with an efficient agitator, a thermometer and a reflux condenser, place the following:

100 grams of starch (converted into the derivative)
750 ml. 20% sodium hydroxide
100 ml. organic halide Heat this mixture at 95 to 105° C. for four hours with vigorous agitation. Neutralize the reaction mixture with HCl (1:1) and concentrate to a sirup under a vacuum. Take up the ether in alcohol and purify in the usual manner.

PROCEDURE 8

Wohl's degradation

[Cohen, Part III, 4th ed., page 8, 1924.]

This method is standard and consists of the following steps:

1. The aldose is treated with hydroxylamine to give the oxime;
2. It is then acetylated (Procedure 9) to remove the water and to block any unreacted hydroxyls;
3. Treatment with amoniacal silver nitrate removes HCN to form the aldose with one less carbon.

Since the saccharides described are generally 2-substituted the pentose is found present as the glucoside at this point and may be isolated as such in the usual manner.

PROCEDURE 9

Acetylation

In a 750 ml. Erlenmeyer fitted with a finger condenser place the following:

10 grams of starch (converted into the derivative)
300 ml. acetic anhydride
30 grams fused sodium acetate Heat this mixture just below the boiling point for about 4 hours. The unreacted acetic anhydride and acetic acid formed is removed by vacuum distillation, care being taken as the mixture approaches dryness.

The reaction product is removed by extraction with appropriate solvent, recovered and purified in the usual manner.

PROCEDURE 10

Deglucosidation

The glucoside radical may be easily removed by the standard procedure consisting essentially of allowing the glucoside to stand at room temperature with 1 N aqueous hydrochloric acid and the free aldose may be separated in the usual manner.

PROCEDURE 11

Oxidation

The glucose derivative corresponding to 100 grams of starch is dissolved in 1000 ml. 10% sulfuric acid. This mixture is placed in a 2000 ml. three-necked flask immersed in ice water. With efficient agitation 100 grams potassium permanganate is added in 5 gram portions. At no time is the temperature allowed to rise over 20° C. At the end of the reaction period (about 2 hours) the excess $KMnO_4$ is destroyed by a stream of sulfur dioxide. The acid solution is neutralized with barium carbonate and the solution evaporated to dryness. The barium salt of the gluconic acid is extracted with alcohol and the product finished in the usual manner.

PROCEDURE 12

Reduction

The glucose derivative obtained from 100 grams of starch is dissolved in 1000 ml. of 10 N methanolic KOH at 60° C. 400 ml. Formalin is then added and methanol added at such a rate that the temperature remains between 60 and 70° C. When the temperature drops the mixture is heated, with agitation, and the temperature maintained at this point for 3 hours and then cooled.

The alkali is neutralized with sulfuric acid (1–5) and the mixture evaporated under vacuum to a sirup. The product is extracted with alcohol and purified in the usual manner.

PROCEDURE 13

Preparation of phenylhydrazones

The glucose derivative is converted into the phenylhydrazone by dissolving in acetic acid and then treating wtih phenylhydrazine base in the usual manner. Prolonged heating is to be avoided.

The crystalline hydrazone is purified by recrystallization from dilute alcohol in the usual manner.

The procedures set out in detail above (with exception of those listed as Procedures 1, 2 and 3) may be modified within wide limits without endangering the expected result.

Procedure 1 may be modified as described in copending applications but the procedure given is the one we recommend for use in conjunction with the other procedures referred to.

Procedure 2 may not be modified in any way other than relative to the alcohol used. The mixture must boil at temperatures of 118 to 135° C. Other defined conditions are required.

Procedure 3 may be modified somewhat as the requirements dictate but the procedure described has been found to be generally most satisfactory.

EXAMPLE I

*Synthesis of 2-ethyl, 3-n propyl, 6-n butyl-α-methyl-D-glucoside*

The following enumerated steps are used to prepare this glucoside.

1. Procedure 1 applied to produce 2-sodium starchate.
2. Procedure 4 applied with ethyl bromide to produce 2-ethyl starchate.
3. Procedure 2 applied to produce 2-ethyl, 3-sodium starchate.
4. Procedure 4 applied with n-propyl bromide to produce 2-ethyl, 3-n propyl starchate.
5. Procedure 3 applied to produce 2-ethyl, 3-n propyl, 6-sodium starchate.
6. Procedure 4 applied with n-butyl bromide to produce 2-ethyl, 3-n propyl, 6-n butyl starchate.
7. Procedure 5 applied with methanol to produce 2-ethyl, 3-n propyl, 6-n butyl, α-methyl-D-glucoside.

EXAMPLE II

*Synthesis of 2-n butyl, 3-n propyl, 6-ethyl, α-methyl-D-glucoside*

The following enumerated steps are used to prepare this glucoside by a method consisting of a combination of steps differing from or differing in order from the steps of the method described in Example I.

1. Procedure 3 applied to produce 6-sodium starchate.
2. Procedure 4 applied with ethyl bromide to produce 6-ethyl starchate.
3. Procedure 1 applied to produce 2-sodium, 6-ethyl starchate.
4. Procedure 4 applied with n-butyl bromide to produce 2-n butyl, 6-ethyl starchate.
5. Procedure 2 applied to produce 2-n butyl, 3-sodium, 6-ethyl starchate.
6. Procedure 4 applied with n-propyl bromide to produce 2-n butyl, 3-n propyl, 6-ethyl starchate.
7. Procedure 5 applied with methanol to produce 2-n butyl, 3-n propyl, 6-ethyl, α-methyl-D-glucoside.

EXAMPLE III

*Synthesis of 2-ethyl, 3-benzyl, 6-isopropyl α-methyl-D-glucoside*

The following enumerated steps are used to prepare this glucoside by a method consisting of a combination of steps differing from or differing in order from the steps of the method described in Examples 1 and 2.

1. Procedure 3 applied to produce 6-sodium starchate.
2. Procedure 4 applied with isopropyl bromide to produce 6-isopropyl starchate.
3. Procedure 1 applied to produce 2-sodium, 6-isopropyl starchate.
4. Procedure 4 applied with ethyl bromide to produce 2-ethyl, 6-isopropyl starchate.
5. Procedure 7 applied with benzyl chloride to produce 2-ethyl, 3-benzyl, 6-isopropyl starchate.
6. Procedure 5 applied with methanol to produce 2-ethyl, 3-benzyl, 6-isopropyl, α-methyl-D-glucoside.

EXAMPLE IV

*Synthesis of 2-n propyl, 3-isopropyl, 6-benzyl-D-glucose*

The following enumerated steps are used to prepare this glucose derivative.

1. Procedure 1 applied to produce 2-sodium starchate.
2. Procedure 4 applied with n-propyl bromide to produce 2-n propyl starchate.
3. Procedure 2 applied to produce 2-n propyl, 3-sodium starchate.
4. Procedure 4 applied with isopropyl bromide to produce 2-n propyl, 3-isopropyl starchate.
5. Procedure 7 applied with benzyl chloride to produce 2-n-propyl, 3-isopropyl, 6-benzyl starchate.
6. Procedure 6 applied to produce 2-n propyl, 3-isopropyl, 6-benzyl, d-glucose.

EXAMPLE V

*Synthesis of 2-methyl, 3-isopropyl, 6-n-propyl-D-glucose*

The following enumerated steps are used to prepare this glucose derivative by a method consisting of a combination of steps differing from or differing in order from the steps of the method described in Example 4.

1. Procedure 3 applied to produce 6-sodium starchate.
2. Procedure 4 applied with n-propyl bromide to produce 6-n propyl starchate.
3. Procedure 1 applied to produce 2-sodium, 6-n propyl starchate.
4. Procedure 4 applied with methyl iodide to produce 2-methyl, 6-n propyl starchate.
5. Procedure 2 applied to produce 2-methyl, 3-sodium, 6-n propyl starchate.
6. Produce 4 applied with isopropyl bromide to produce 2-methyl, 3-isopropyl, 6-n propyl starchate.
7. Procedure 6 applied to produce 2-methyl, 3-isopropyl, 6-n propyl-D-glucose.

EXAMPLE VI

*Synthesis of 2-n propyl, 3-methyl, 6-isobutyl-D-glucose*

The following enumerated steps are used to prepare this glucose derivative by a method consisting of a combination of steps differing from or differing in order from the steps of the method described in Examples 4 and 5.

1. Procedure 1 applied to produce 2-sodium starchate.
2. Procedure 4 applied with n-propyl bromide to produce 2-n propyl bromide.
3. Procedure 2 applied to produce 2-n propyl, 3-sodium starchate.
4. Procedure 4 applied with methyl iodide to produce 2-n propyl, 3-methyl starchate.
5. Procedure 3 applied to produce 2-n propyl, 3-methyl, 6-sodium starchate.
6. Procedure 4 applied with isobutyl bromide to produce 2-n propyl, 3-methyl, 6-isobutyl starchate.
7. Procedure 6 applied to produce 2-n propyl, 3-methyl, 6-isobutyl-D-glucose.

EXAMPLE VII

*Synthesis of 2-monomethyl-α-methyl-D-glucoside*

The following enumerated steps are used to prepare this glucoside.

1. Procedure 1 applied to produce 2-sodium starchate.
2. Procedure 4 applied with methyl iodide to duce 2-methyl-α-methyl-D-glucoside.
3. Procedure 5 applied with methanol to produce 2-methyl-α-methyl-D-glucoside.

EXAMPLE VIII

*Synthesis of 6-monomethyl-α-methyl-D-glucoside*

The following enumerated steps are used to prepare this glucoside.
1. Procedure 3 applied to produce 6-sodium starchate.
2. Procedure 4 applied with methyl iodide to produce 6-methyl starchate.
3. Procedure 5 applied with methanol to produce 6-methyl-α-methyl-D-glucoside.

EXAMPLE IX

*Synthesis of 2-methyl, 6-ethyl-α-n propyl-D-glucoside*

The following enumerated steps are used to prepare this glucoside.
1. Procedure 3 applied to produce 6-sodium starchate.
2. Procedure 4 applied with ethyl bromide to produce 6-ethyl starchate.
3. Procedure 1 applied to produce 2-sodium, 6-ethyl starchate.
4. Procedure 4 applied with methyl iodide to produce 2-methyl, 6-ethyl starchate.
5. Procedure 5 applied with n-propanol to produce 2-methyl, 6-ethyl-α-n propyl-D-glucoside.

EXAMPLE X

*Synthesis of 2-methyl, 3-ethyl-α-n propyl-D-glucoside*

The following enumerated steps are used to prepare this glucoside.
1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 5 applied with n-propanol to produce 2-methyl, 3-ethyl, α-n propyl-D-glucoside.

EXAMPLE XI

*Synthesis of 2-methyl, 3-benzyl, 6-n propyl-α-phenyl-D-glucoside*

The following enumerated steps are used to prepare this glucoside.
1. Procedure 3 applied to produce 6-sodium starchate.
2. Procedure 4 applied with n propyl bromide to produce 6-n propyl starchate.
3. Procedure 1 applied to produce 2-sodium, 6-n propyl starchate.
4. Procedure 4 applied with methyl iodide to produce 2-methyl, 6-n propyl starchate.
5. Procedure 7 applied with benzyl chloride to produce 2-methyl, 3-benzyl, 6-n propyl starchate.
6. Procedure 5 applied with phenol to produce 2-methyl, 3-benzyl, 6-n propyl-α-phenyl-D-glucoside.

EXAMPLE XII

*Synthesis of 2-ethyl, 3-methyl, 6-isopropyl-α-benzyl-D-glucoside*

The following enumerated steps are used to prepare this glucoside.
1. Procedure 1 applied to produce 2-sodium starchate.
2. Procedure 4 applied with ethyl bromide to produce 2-ethyl starchate.
3. Procedure 2 applied to produce 2-ethyl, 3-sodium starchate.
4. Procedure 4 applied with methyl iodide to produce 2-ethyl, 3-methyl starchate.
5. Procedure 3 applied to produce 2-ethyl, 3-methyl, 6-sodium starchate.
6. Procedure 4 applied with isopropyl bromide to produce 2-ethyl, 3-methyl, 6-isopropyl starchate.
7. Procedure 5 applied with benzyl alcohol to produce 2-ethyl, 3-methyl, 6-isopropyl-α-benzyl-D-glucoside.

EXAMPLE XIII

*Synthesis of 2-methyl-D-glucose*

The following enumerated steps are used to prepare this glucose derivative.
1. Procedure 1 applied to produce 2-sodium starchate.
2. Procedure 4 applied with methyl iodide to produce 2-methyl starchate.
3. Procedure 6 applied to produce 2-methyl-D-glucose.

EXAMPLE XIV

*Synthesis of 6-methyl-D-glucose*

The following enumerated steps are used to prepare this glucose derivative.
1. Procedure 3 applied to produce 6-sodium starchate.
2. Procedure 4 applied with methyl iodide to produce 6-methyl starchate.
3. Procedure 6 applied to produce 6-methyl-D-glucose.

EXAMPLE XV

*Synthesis of 2,3-dimethyl-D-glucose*

The following enumerated steps are used to prepare this glucose derivative.
1. Procedure 2 applied to produce 2,3-disodium starchate.
2. Procedure 4 applied with methyl iodide to produce 2,3-dimethyl starchate.
3. Procedure 6 applied to produce 2,3-dimethyl-D-glucose.

EXAMPLE XVI

*Synthesis of 2,6-dimethyl-D-glucose*

The following enumerated steps may be used to prepare this glucose derivative.
1. Procedure 3 applied to prepare 6-sodium starchate.
2. Procedure 4 applied with methyl iodide to produce 6-methyl starchate.
3. Procedure 1 applied to prepare 2-sodium, 6-methyl starchate.
4. Procedure 4 applied with methyl iodide to prepare 2,6-dimethyl starchate.
5. Procedure 6 applied to produce 2,6-dimethyl-D-glucose.

EXAMPLE XVII

*Synthesis of 2-methyl, 3-ethyl, 4-butyl, 6-benzyl-α-methyl-D-glucoside*

The following enumerated steps are used to prepare this glucoside.
1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 7 applied with benzyl chloride to produce 2-methyl, 3-ethyl, 6-benzyl starchate.
6. Procedure 5 applied with methanol to produce 2-methyl, 3-ethyl, 6-benzyl-α-methyl-D-glucoside.

7. Procedure 3 applied to produce 2-methyl, 3-ethyl, 4-sodium, 6-benzyl-α-methyl-D-glucoside.

8. Procedure 4 applied with butyl bromide to produce 2-methyl, 3-ethyl, 4-butyl, 6-benzyl-α-methyl-D-glucoside.

EXAMPLE XVIII

*Synthesis of 2-methyl, 3-ethyl, 4-butyl, 6-benzyl-α-methyl-D-glucoside*

The following enumerated steps are used to prepare this glucoside.

1. Procedure 3 applied to produce 6-sodium starchate.
2. Procedure 4 applied with benzyl chloride to produce 6-benzyl starchate.
3. Procedure 1 applied to produce 2-sodium, 6-benzyl starchate.
4. Procedure 4 applied with methyl iodide to produce 2-methyl, 6-benzyl starchate.
5. Procedure 2 applied to produce 2-methyl, 3-sodium, 6-benzyl starchate.
6. Procedure 4 applied with ethyl bromide to produce 2-methyl, 3-ethyl, 6-benzyl starchate.
7. Procedure 5 applied with methanol to produce 2-methyl, 3-ethyl, 6-benzyl, α-methyl-D-glucoside.
8. Procedure 7 applied with butyl bromide to produce 2-methyl, 3-ethyl, 4-butyl, 6-benzyl-α-methyl-D-glucoside.

EXAMPLE XIX

*Synthesis of 2-methyl, 3-ethyl, 4-butyl, 6-benzyl-α-methyl-D-glucoside*

The following enumerated steps are used to prepare this glucoside.

1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 3 applied to prepare 2-methyl, 3-ethyl, 6-sodium starchate.
6. Procedure 4 applied with benzyl bromide to produce 2-methyl, 3-ethyl, 6-benzyl starchate.
7. Procedure 5 applied with methanol to produce 2-methyl, 3-ethyl, 6-benzyl α-methyl-D-glucoside.
8. Procedure 7 applied with butyl bromide to produce 2-methyl, 3-ethyl, 4-butyl, 6-benzyl-α-methyl-D-glucoside.

EXAMPLE XX

*Synthesis of 2-methyl, 3-ethyl, 4,5-diacetyl, 6-butyl-D-glucose*

The following enumerated steps are used to prepare this glucose derivative.

1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 7 applied with n-butyl bromide to produce 2-methyl, 3-ethyl, 6-n-butyl starchate.
6. Procedure 6 applied to produce 2-methyl, 3-ethyl, 6-n butyl-D-glucose.
7. Procedure 9 applied with acetic anhydride to produce 2-methyl, 3-ethyl, 4,5-diaceto, 6-butyl-D-glucose.

EXAMPLE XXI

*Synthesis of 2-methyl, 3-ethyl, 4,5-diacetyl, 6-butyl-D-glucose*

The following enumerated steps are used to prepare this glucose derivative.

1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 3 applied to produce 2-methyl, 3-ethyl, 6-sodium starchate.
6. Procedure 4 applied with n-butyl bromide to produce 2-methyl, 3-ethyl, 6-n-butyl starchate.
7. Procedure 6 applied to produce 2-methyl, 3-ethyl, 6-n-butyl-D-glucose.
8. Procedure 9 applied with acetic anhydride to produce 2-methyl, 3-ethyl, 4,5-diaceto, 6-n-butyl-D-glucose.

EXAMPLE XXII

*Synthesis of 2-methyl, 3-ethyl, 4,5-diacetyl, 6-butyl-D-glucose*

The following enumerated steps are used to prepare this glucose derivative.

1. Procedure 3 applied to produce 6-sodium starchate.
2. Procedure 4 applied with butyl bromide to produce 6-n-butyl starchate.
3. Procedure 1 applied to produce 2-sodium, 6-n butyl starchate.
4. Procedure 4 applied with methyl iodide to produce 2-methyl, 6-n butyl starchate.
5. Procedure 2 applied to produce 2-methyl, 3-sodium 6-n butyl starchate.
6. Procedure 4 applied with ethyl bromide to produce 2-methyl, 3-ethyl, 6-n butyl starchate.
7. Procedure 6 applied to produce 2-methyl, 3-ethyl, 6-n butyl-D-glucose.
8. Procedure 9 applied with acetic anhydride to produce 2-methyl, 3-ethyl, 4,5-diaceto, 6-n butyl-D-glucose.

EXAMPLE XXIII

*Synthesis of 2-ethyl, 3-isopropyl, 5-butyl, α-methyl-D-riboside*

The following enumerated steps are used to prepare this glucoside.

1. Procedure 3 applied to produce 6-sodium starchate.
2. Procedure 4 applied with n-butyl bromide to produce 6-n butyl starchate.
3. Procedure 1 applied to produce 2-sodium, 6-n butyl starchate.
4. Procedure 4 applied with methyl iodide to produce 2-methyl, 6-n butyl starchate.
5. Procedure 2 applied to produce 2-methyl, 3-sodium, 6-n butyl starchate.
6. Procedure 4 applied with ethyl bromide to produce 2-methyl, 3-ethyl, 6-n butyl starchate.
7. Procedure 6 applied to produce 2-methyl, 3-ethyl, 6-n butyl-D-glucose.
8. Procedure 8 applied to produce 2-ethyl, 5-n butyl, α-methyl-D-riboside.
9. Procedure 7 applied with isopropyl bromide to produce 2-ethyl, 3-isopropyl, 5-n butyl, α-methyl-D-riboside.

EXAMPLE XXIV

Synthesis of 2-methyl, 3-ethyl, 4-isopropyl, 5-acetyl, 6-butyl, D-glucose phenylhydrazone

The following enumerated steps are used to prepare this glucose derivative.

1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl iodide to produce 2-methyl, 3-ethyl starchate.
5. Procedure 3 applied to produce 2-methyl, 3-ethyl, 6-sodium starchate.
6. Procedure 5 applied with n-butyl bromide to produce 2-methyl, 3-ethyl, 6-n butyl starchate.
7. Procedure 5 applied with methanol to produce 2-methyl, 3-ethyl, 6-butyl, α-methyl-D-glucoside.
8. Procedure 7 applied with isopropyl bromide to produce 2-methyl, 3-ethyl, 4-isopropyl, 6-butyl, α-methyl-D-glucoside.
9. Procedure 10 applied to produce 2-methyl, 3-ethyl, 4-isopropyl, 6-butyl, D-glucose.
10. Procedure 9 applied to produce 2-methyl, 3-ethyl, 4-isopropyl, 5-acetyl, 6-butyl-D-glucose.
11. Procedure 13 applied to produce 2-methyl, 3-ethyl, 4-isopropyl, 5-acetyl, 6-butyl-D-glucose phenylhydrazone.

EXAMPLE XXV

Synthesis of 2-monomethyl, 3,4,5,6-glucose tetraacetate

The following enumerated steps are used to prepare this glucose derivative.

1. Procedure 1 applied to produce 2-sodium starchate.
2. Procedure 4 applied with methyl iodide to produce 2-methyl starchate.
3. Procedure 6 applied to produce 2-methyl-D-glucose.
4. Procedure 9 applied to produce 2-methyl, 3,4,5,6-D-glucose tetraacetate.

EXAMPLE XXVI

Synthesis of 2-methyl, 6-ethyl gluconic acid

The following enumerated steps are used to prepare this glucose derivative.

1. Procedure 3 applied to produce 6-sodium starchate.
2. Procedure 4 applied with ethyl bromide to produce 6-ethyl starchate.
3. Procedure 1 applied to produce 2-sodium, 6-ethyl starchate.
4. Procedure 4 applied with methyl iodide to produce 2-methyl, 6-ethyl starchate.
5. Procedure 6 applied to produce 2-methyl, 6-ethyl-D-glucose.
6. Procedure 11 applied to produce 2-methyl, 6-ethyl-gluconic acid.

EXAMPLE XXVII

Synthesis of 2-methyl, 3-ethyl, 6-isopropyl sorbitol

The following enumerated steps are used to prepare this glucose derivative.

1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 7 applied with isopropyl bromide to produce 2-methyl, 3-ethyl, 6-isopropyl starchate.
6. Procedure 6 applied to produce 2-methyl, 3-ethyl, 6-isopropyl-D-glucose.
7. Procedure 12 applied to produce 2-methyl, 3-ethyl, 6-isopropyl sorbitol.

The glucoses and glucosides produced as described above may be esterified, acetylated, sulfonated or subjected to any reaction which an alcohol group will undergo.

If an organic starchate having an organic group on the C-2 carbon or on the C-6 carbon is (instead of being subjected to glucosidic hydrolysis or acid hydrolysis) subjected to the action of various amylolytic enzymes as described in the prior art literature, only liquefaction occurs. The reducing value of the digest does not increase above that which would be expected from the unreacted glucose units. Thus it appears that no hydrolysis of the monoorganic radical takes place. Therefore there is produced a depolymerized non-reducing soluble starch-like product which may be dehydrated according to the art to produce soluble starch-like products which are readily dispersible in cold water. These products are apparently very hygroscopic and very adhesive.

As stated above, inventions relating to: monometallic starchates (both alkali and non-alkali); monoorganic starchates; polyalkali starchates; polymetallic starchates (non-alkali); polyorganic starchates; and methods for the preparation of all such starchates have or will be fully disclosed and claimed in co-pending applications. Mono and poly organic non-metallic starchates, the reaction products of starch with sodium hydro-sulfide (NaSH) and sodium sulfide ($Na_2S$) and methods for their preparation; starch products which have been depolymerized by amylolytic enzymes (as are briefly described in the last paragraph) and methods for their preparation will also be fully disclosed and claimed in co-pending applications.

It is to be understood that the described embodiments of our invention are only illustrative and are not intended to limit the invention. The scope of the invention is defined by the following claims.

We claim:

1. A process of producing a glucoside which comprises the steps of reacting starch with an alkali metal hydroxide selected from the class consisting of lithium hydroxide, sodium hydroxide, and potassium hydroxide dissolved in an alcoholic solvent, at a temperature of from 78° C. to approximately 115° C. with the alkali hydroxide present in at least approximately stoichiometric quantities in relation to the starch to produce a 2-monoalkali starchate; reacting the 2-monoalkali starchate so produced with an alkyl halide dispersed in a nonaqueous solution at a temperature of from 80° C. to 115° C. to produce a 2-monoorganic starchate; reacting the 2-monoorganic starchate so produced with alkali hydroxide selected from the class consisting of lithium hydroxide, sodium hydroxide, and potassum hydroxide dissolved in at least approximately stoichiometric quantities in an alcoholic solvent at a temperature in excess of 115° C. with provision for removal of water formed by the reaction to produce 2-monoorganic, 3-monoalkali starchate; reacting the 2-monoorganic, 3-monoalkali starchate with an alkyl halide at a temperature of at least 115° C. to produce a 2,3-diorganic starchate; reacting the 2,3-diorganic starchate so formed with an alkali metal selected from the class consisting of lithium, sodium, and potassium dissolved in ammonia with the alkali present in approximately stoichiometric quantities with the starchate to produce a 2,3-diorganic, 6-monoalkali starchate; reacting the diorganic monoalkali starchate so formed with an alkyl halide to produce a 2,3,6-triorganic starchate; mixing the triorganic starchate so formed with an alcoholic acid solution to produce by glucosidic hydrolysis of the starchate a 2,3,6-triorganic α-glucoside; and etherifying the glucoside so formed to produce a 2,3,4,6-tetraorganic α-glucoside.

2. A process of producing a glucose which comprises the steps of reacting starch with an alkali metal hydroxide selected from the class consisting of lithium hydroxide, sodium hydroxide, and potassium hydroxide dissolved in a substantially non-aqueous alcoholic solvent, at a temperature of from 78° C. to approximately 115° C. with the alkali hydroxide present in at least approximately stoichiometric quantities in relation to the starch to produce a 2-monoalkali starchate; reacting the 2-monoalkali starchate so produced with an alkyl halide dispersed in a nonaqueous solution at a temperature of from 80° C. to 115° C. to produce a 2-monoorganic starchate; reacting the 2-monoorganic starchate so produced with alkali hydroxide dissolved in at least approximately stoichiometric quantities in a substantially non-aqueous alcoholic solvent at a temperature in excess of 115° C. with provision for removal of water formed by the reaction to produce a 2-monoorganic, 3-monoalkali starchate; reacting the 2-monoorganic, 3-monoalkali starchate with an alkyl halide at a temperature of at least 115° C. to produce a 2,3-diorganic starchate; reacting the 2,3-diorganic starchate so formed with an alkali metal dissolved in ammonia with the alkali present in approximately stoichiometric quantities with the starchate to produce a 2,3-diorganic, 6-monoalkali starchate; reacting the diorganic monoalkali starchate so formed with an alkyl halide to produce a 2,3,6-triorganic starchate; mixing the triorganic starchate so formed with an aqueous acid solution to produce by acid hydrolysis of the starchate a 2,3,6-triorganic glucose; and etherifyng such glucose to produce a 2,3,4,5,6-pentaorganic glucose.

3. A process of producing substantially uniformly substituted ethers of glucopyranose monomers from starch which comprises the steps of mixing starch with an alkali metal hydroxide selected from the class consisting of lithium hydroxide, sodium hydroxide and potassium hydroxide dissolved in a substantially nonaqueous alcoholic solvent at a temperature in the range of from 115° C. to 118° C. with the alkali hydroxide being supplied in approximately double stoichiometric quantities in relation to the starch to cause a reaction to replace uniformly the hydrogen atoms of the hydroxyl groups on the two carbon atoms next adjacent to the No. 1 carbon of substantially all of the starch units which comprise the starch molecules by the metal of said metal hydroxide to produce a substantially uniformly substituted 2,3-alkali metal starchate; subsequently etherifying the starchate so formed by mixing it with an alkyl halide dispersed in a nonaqueous solvent at a temperature of from 80° C. to about 115° C. to substitute alkyl radicals in place of the metal atoms and form a substantially uniformly substituted 2,3-alkyl starchate; and subsequently mixing the uniformly substituted alkyl starchate so formed with an acid solution to produce by hydrolysis of the starchate, substantially uniformly substituted 2,3-alkyl ethers of glucopyranose monomers.

4. A process of producing substantially uniformly substituted glucose from starch which comprises the steps of mixing starch with an alkali metal hydroxide selected from the class consisting of lithium hydroxide, sodium hydroxide and potassium hydroxide dissolved in a substantially nonaqueous alcoholic solvent at a temperature in the range of from 115° C. to 118° C. with the alkali hydroxide being supplied in approximately double stoichiometric quantities in relation to the starch to cause a reaction to replace uniformly the hydrogen atoms of the hydroxyl groups on the two carbon atoms next adjacent to the No. 1 carbon of substantially all of the starch units which comprise the starch molecules by the metal of said metal hydroxide to produce a substantially uniformly substituted 2,3-alkali metal starchate; subsequently etherifying the starchate so formed by mixing it with an alkyl halide dispersed in a nonaqueous solvent at a temperature of from 80° C. to about 115° C. to substitute alkyl radicals in place of the metal atoms and form a substantially uniformly substituted 2,3-alkyl starchate; and subsequently mixing the uniformly substituted alkyl starchate so formed with an aqueous acid solution to produce by hydrolysis of the starchate, substantially uniformly substituted glucose.

5. A process of producing substantially uniformly substituted glucose from starch which comprises the steps of mixing starch with an alkali metal hydroxide selected from the class consisting of lithium hydroxide, sodium hydroxide and potassium hydroxide dissolved in a substantially nonaqueous alcoholic solvent at a temperature in the range of from 80° C. to approximately 115° C. with the alkali hydroxide being supplied in approximately stoichiometric quantities in relation to the starch to cause a reaction to replace uniformly the hydrogen atoms of the hydroxyl groups on the No. 2 carbon atoms of substantially all of the starch units which comprise the starch molecules by the metal of said metal hydroxide to produce a substantially uniformly substituted 2-alkali metal starchate; etherifying the starchate so formed by mixing it with an alkyl halide dispersed in a nonaqueous solvent at a temperature of from 80° C. to about 115° C. to substitute an aklyl radical in place of the metal atoms and form a substantially uniformly substituted 2-alkyl starchate; mixing the 2-alkyl starchate so formed with an alkali metal hydroxide selected from the class consisting of lithium hydroxide, sodium hydroxide and potassium hydroxide dissolved in a substantially nonaqueous alcoholic solvent at a temperature in the range of from 115° C. to 118° C. with the alkali hydroxide being supplied in approximately stoichiometric quantities in relation to the starchate to cause a reaction to replace uniformly the hydrogen atoms of the hydroxyl groups on the No. 3 carbon atom of substantially all of the starch units which comprise the starch molecules by the metal of said metal hydroxide to produce a substantially uniformly substituted 2-alkyl, 3-alkali metal starchate; subsequently etherifying the 2-alkyl, 3-alkali metal starchate so formed by mixing it with an alkyl halide dispersed in a nonaqueous solvent at a temperature of from 80° C. to about 115° C. to substitute alkyl radicals in place of the metal atoms and form a substantially uniformly substituted 2,3-alkyl starchate; and subsequently mixing the uniformly substituted 2,3-alkyl starchate so formed with an aqueous acid solution to produce by hydrolysis of the starchate, a substantially uniformly substituted 2,3-alkyl glucose, in which the alkyl groups on the No. 2 and the No. 3 carbon atoms are different from each other.

6. A process of producing substantially uniformly substituted 2,3,4,5,6-penta organic glucose from starch which comprises the steps of mixing starch with an alkali metal hydroxide selected from the class consisting of lithium hydroxide, sodium hydroxide and potassium hydroxide dissolved in a substantially nonaqueous alcoholic solvent at a temperature in the range of from 80° C. to approximately 115° C. with the alkali hydroxide being supplied in approximately stoichiometric quantities in relation to the starch to cause a reaction to replace uniformly the hydrogen atoms of the hydroxyl groups on the No. 2 carbon atoms of substantially all of the starch units which comprise the starch molecules by the metal of said metal hydroxide to produce a substantially uniformly substituted 2-alkali metal starchate; etherifying the starchate so formed by mixing it with an alkyl halide dispersed in a non-aqueous solvent at a temperature of from 80° C. to about 115° C. to substitute an alkyl radical in place of the metal atoms and form a substantially uniformly substituted 2-alkyl starchate; mixing the 2-alkyl starchate so formed with an alkali metal hydroxide dissolved in a substantially nonaqueous alcoholic solvent at a temperature in the range of from 115° to 118° C. with the alkali hydroxide being supplied in approximately stoichiometric quantities in relation to the starchate to cause a reaction to replace uniformly the hydrogen atoms of the hydroxyl groups on the No. 3 carbon atom of substantially all of the starch units which comprise the starch molecules by the metal of said metal hydroxide to produce a substantially uniformly substituted 2-alkyl, 3-alkali metal starchate; subsequently etherifying the 2-alkyl, 3-alkali metal starchate so formed by mixing it with an alkyl halide dispersed in a nonaqueous solvent at a temperature of from 80° C. to about 115° C. to substitute alkyl radicals in place of the metal atoms and form a substantially uniformly substituted 2,3-alkyl starchate; subsequently mixing the uniformly substituted 2,3-alkyl starchate so formed with an aqueous acid solution to produce by hydrolysis of the starchate, a substantially uniformly substituted 2,3-alkyl glucose; and thereafter etherifying the 2,3-alkyl starchate to produce a 2,3,4,5,6-penta organic glucose.

7. A process of producing substantially uniformly substituted glucose from starch which comprises the steps of mixing starch with an alkali metal hydroxide selected from the class consisting of lithium hydroxide, sodium hydroxide and potassium hydroxide dissolved in a substantially nonaqueous alcoholic solvent at a temperature in the range of from 80° C. to approximately 115° C. with the alkali hydroxide being supplied in approximately stoichiometric quantities in relation to the starch to cause a reaction to replace uniformly the hydrogen atoms of the hydroxyl groups on the No. 2 carbon atoms of substantially all of the starch units which comprise the starch molecules by the metal of said metal hydroxide to produce a substantially uniformly substituted 2-alkali metal starchate; etherifying the starchate so formed by mixing it with an alkyl halide dispersed in a nonaqueous solvent at a temperature of from 80° C. to about 115° C. to substitute an alkyl radical in place of the metal atoms and form a substantially uniformly substituted 2-alkyl starchate; mixing the 2-alkyl starchate so formed with an alkali metal hydroxide selected from the class consisting of lithium hydroxide, sodium hydroxide and potassium hydroxide dissolved in a substantially nonaqueous alcoholic solvent at a temperature in the range of from 115° C. to 118° C. with the alkali hydroxide being supplied in approximately stoichiometric quantities in relation to the starchate to cause a reaction to replace uniformly the hydrogen atoms of the hydroxyl groups on the No. 3 carbon atom of substantially all of the starch units which comprise the starch molecules by the metal of said metal hydroxide to produce a substantially uniformly substituted 2-alkyl, 3-alkali metal starchate; subsequently etherifying the 2-alkyl, 3-alkali metal starchate so formed by mixing it with an alkyl halide containing a different alkyl group from that previously substituted, dispersed in a nonaqueous solvent at a temperature of from 80° C. to about 115° C. to substitute alkyl radicals in place of the metal atoms and form a substantially uniformly substituted 2,3-alkyl starchate in which the alkyl groups are different; and subsequently mixing the uniformly substituted 2,3-alkyl starchate so formed with an aqueous acid solution to produce by hydrolysis of the starchate, a substantially uniformly substituted 2,3-alkyl glucose in which the alkyl groups on the No. 2 and the No. 3 carbon atoms are different from each other; and thereafter etherifying the 2,3-alkyl starchate to produce a 2,3,4,5,6-penta organic glucose in which the alkyl groups on the No. 2 and the No. 3 carbons are still different from each other.

8. A process of preparing a substantially uniformly substituted ether of glucose and its derivatives in which the positions of the organic groups are accurately known comprising in combination the steps of mixing starch with an alkali metal hydroxide selected from the class consisting of lithium hydroxide, sodium hydroxide and potassium hydroxide dissolved in a substantially nonaqueous alcoholic solvent at a temperature in the range of from 115° C. to approximately 118° C. with the alkali hydroxide being supplied in approximately double stoichiometric quantities in relation to the starch to cause a reaction to substitute metallic atoms in place of the hydrogen atoms of the hydroxyl groups on the 2 and 3 carbons of each of substantially all of the various units comprising the starch molecule; selectively etherifying the starchate so formed by mixing it with an alkyl halide dispersed in a non-aqueous solvent at a temperature of from 80° C. to about 115° C. to substitute alkyl radicals in place of metal atoms and form a substantially uniformly substituted alkyl starchate; and hydrolyzing the diethers so formed by aqueous acid hydrolysis.

9. A process of producing a substantially uniformly substituted polyalkyl glucoside which comprises the steps of mixing starch with an alkali metal hydroxide selected from the class consisting of lithium hydroxide, sodium hydroxide, and potassium hydroxide dissolved in a substantially nonaqueous alcoholic system at a temperature in the range of from 80° C. to 115° C. with the alkali hydroxide supplied in at least stoichiometric quantities to cause a reaction to produce an alkali metal starchate; reacting the alkali starchate by mixing it with an alkyl halide dispersed in a nonaqueous solvent at a temperature in the range of from 80° C. to about 115° C. to produce a monoalkyl starchate; reacting the monoalkyl starchate by mixing it with an alkali metal hydroxide selected from the class consisting of lithium hydroxide, sodium hydroxide, and potassium hydroxide dissolved in a substantially nonaqueous alcoholic system at a temperature in the range of from 115° C. to 118° C. with the alkali hydroxide supplied in at least stoichiometric quantities to produce a mixed 2-alkyl, 3-alkali starchate; reacting the mixed alkyl starchate by mixing it with an alkyl halide dispersed in a nonaqueous solvent at a temperature in the range of 80° C. to about 115° C. to produce a 2,3-polyalkyl starchate; and subjecting the polyalkyl starchate so formed to glucosidic hydrolysis by mixing an alcoholic acid solution therewith to produce an alkyl glucoside.

10. A process of producing a substantially uniformly substituted alkyl glucoside which comprises the steps of mixing starch with alkali metal hydroxide selected from the class consisting of lithium hydroxide, sodium hydroxide, and potassium hydroxide dissolved in a substantially nonaqueous alcoholic system at a temperature in the range of from 115° C. to 118° C. with the alkali hydroxide supplied in at least double stoichiometric quantities to cause a reaction to produce a 2,3-dialkali metal starchate; and subsequently reacting the product by mixing it with an ethereal salt dispersed in a nonaqueous solvent at a temperature in the range of 80° C. to 115° C. to produce a 2,3-dialkyl starchate; and mixing the dialkyl starchate so formed with an alcoholic acid solution to effect glucosidic hydrolysis of the starchate to produce a 2,3-dialkyl glucoside.

11. A process of forming a substantially uniformly substituted polyalkyl glucoside which comprises the steps of mixing starch with an alkali metal hydroxide selected from the class consisting of lithium hydroxide, sodium hydroxide, and potassium hydroxide dissolved in a substantially nonaqueous alcoholic system at a temperature in the range of from 115° C. to 118° C. with the alkali hydroxide supplied in at least double stoichiometric quantities to cause a reaction to produce a 2,3-dialkali metal starchate; subsequently reacting the product by mixing it with an alkyl halide dispersed in a nonaqueous solvent at a temperature in the range of 80° C. to about 115° C. to produce a 2,3-dialkyl starchate; subsequently reacting the product by a process comprising mixing it with alkali metal selected from the class consisting of lithium, sodium and potassium dissolved in liquid ammonia; and subsequently reacting the product by mixing it with an alkyl halide dispersed in a nonaqueous solvent at a temperature in the range of 80° C. to about 118° C. to produce a 2,3,6-trialkyl starchate; and effecting glucosidic hydrolysis of the starchate so formed by mixing it with an alcoholic acid solution to produce a 2,3,6-trialkyl glucoside.

12. The process of producing a substantially uniformly substituted 2,3,4,5,6-pentaalkyl glucoside which comprises the steps of mixing starch with an alkali metal hydroxide selected from the class consisting of lithium hydroxide, sodium hydroxide, and potassium hydroxide dissolved in a substantially nonaqueous alcoholic system at a temperature in the range of from 80° C. to 115° C. with the alkali hydroxide supplied in at least stoichiometric quantities to cause a reaction to product a 2-monoalkali starchate; reacting the alkali starchate so produced by mixing it with an alkyl halide dispersed in a nonaqueous solvent at a temperature in the range of 80° C. to about 118° C. to produce a 2-monoalkyl starchate; mixing the monoalkyl starchate so formed with an alkali hydroxide selected from the class consisting of lithium hydroxide, sodium hydroxide, and potassium hydroxide dissolved in a substantially nonaqueous alcoholic system at a temperature in the range of from 115° C. to 118° C. with the alkali hydroxide supplied in at least stoichiometric quantities to cause a reaction to produce a 2-monoalkyl 3-monoalkali starchate; reacting the starchate so formed by mixing it with an alkyl halide dispersed in a nonaqueous solvent at a temperature in the range of 80° C. to about 118° C. to produce a 2,3-dialkyl starchate; mixing the dialkyl starchate so formed with an alkali metal selected from the class consisting of lithium, sodium and potassium dissolved in liquid ammonia to produce a 2,3-dialkyl 6-monoalkali starchate; reacting the starchate so formed by mixing it with an alkyl halide dispersed in a nonaqueous solvent at a temperature in the range of 80° C. to about 118° C. to produce a 2,3,6-trialkyl starchate; reacting the trialkyl starchate so formed by mixing with an alcoholic acid solution to produce by glucosidic hydrolysis of the starchate a 2,3,6-trialkyl glucoside; and etherifying the glucoside so formed.

13. The process of producing a substantially uniformly substituted polyorganic glucoside which comprises the steps of mixing starch with an alkali metal hydroxide selected from the class consisting of lithium hydroxide, sodium hydroxide, and potassium hydroxide dissolved in a substantially nonaqueous alcoholic system at a temperature in the range of from 80° C. to 118° C. with the alkali hydroxide supplied in at least stoichiometric quantities to cause a reaction to produce an alkali metal starchate and subsequently reacting by mixing with an alkali metal selected from the class consisting of lithium, sodium, and potassium dissolved in liquid ammonia and mixing the products of such alkali reactions with alkyl halides dispersed in nonaqueous solvent at temperatures in the range of 80° C. to about 118° C. to produce a 2,3,6-triorganic starchate; reacting the triorganic starchate so formed with an alcoholic acid solution to produce by glucosidic hydrolysis a 2,3,6-triorganic glucoside; and etherifying the glucoside so formed to produce a 2,3,4,6-tetraorganic glucoside.

14. A process of forming a substantially uniformly substituted polyorganic glucose which comprises the steps of mixing starch with an alkali metal hydroxide selected from the class consisting of lithium hydroxide, sodium hydroxide, and potassium hydroxide dissolved in a substantially nonaqueous alcoholic system at a temperature in the range of from 80° C. to 118° C. with the alkali hydroxide supplied in at least stoichiometric quantities to cause a reaction to produce an alkali metal starchate and subsequently reacting by mixing with an alkali metal selected from the class consisting of lithium, sodium, and potassium dissolved in liquid ammonia and mixing the products of such alkali reactions with alkyl halides dispersed in nonaqueous solvent at temperatures in the range of 80° C. to about 118° C. to produce a 2,3,6-triorganic starchate; and effecting acid hydrolysis of the starchate so formed by mixing it with an aqueous acid solution to produce a 2,3,6-triorganic glucose.

15. The process of producing a substantially uniformly substituted 2,3,4,5,6-pentaalkyl glucose which comprises the steps of mixing starch with an alkali metal hydroxide selected from the class consisting of lithium hydroxide, sodium hydroxide, and potassium hydroxide dissolved in a substantially nonaqueous alcoholic system at a temperature in the range of from 80° C. to 115° C. with the alkali hydroxide supplied in at least stoichiometric quantities to cause a reaction to produce a 2-monoalkali starchate; reacting the starchate so produced by mixing it with an alkyl halide dispersed in a nonaqueous solvent at a temperature in the range of 80° C. to about 118° C. to produce a 2-monoalkyl starchate; reacting the monoalkyl starchate so formed by mixing it with an alkali hydroxide selected from the class consisting of lithium hydroxide, sodium hydroxide, and potassium hydroxide dissolved in a substantially nonaqueous alcoholic system at a temperature in the range of from 115° C. to 118° C. with the alkali hydroxide supplied in at least stoichiometric quantities to cause a reaction to produce a 2-monoalkyl 3-monoalkali starchate; reacting the starchate so formed by mixing it with an alkyl halide dispersed in a nonaqueous solvent at a temperature in the range of 80° C. to about 118° C. to produce a 2,3-dialkyl starchate; reacting the dialkyl starchate so formed by mixing it with an alkali metal selected from the class consisting of lithium, sodium and potassium dissolved in liquid ammonia to produce a 2,3-dialkyl 6-monoalkali starchate; reacting the starchate so formed by mixing it with an alkyl halide dispersed in a nonaqueous solvent at a temperature in the range of 80° C. to about 118° C. to produce a 2,3,6-trialkyl starchate; reacting the trialkyl starchate so formed by mixing it with an aqueous acid solution to produce by acid hydrolysis of the starchate a 2,3,6-trialkyl glucose; and etherifying the glucose so formed.

16. The process of producing a substantially uniformly substituted polyorganic glucose which comprises the steps of mixing starch with an alkali metal hydroxide selected from the class consisting of lithium hydroxide, sodium hydroxide, and potassium hydroxide dissolved in a substantially nonaqueous alcoholic system at a temperature in the range of from 80° C. to 118° C. with the alkali hydroxide supplied in at least stoichiometric quantities to cause a reaction to produce an alkali metal starchate; subsequently reacting the product by a process comprising mixing the starchate with an alkali metal selected from the class consisting of lithium, sodium, and potassium dissolved in liquid ammonia; and reacting the products of such alkali reactions with alkyl compounds to produce a 2,3,6-triorganic starchate; reacting the triorganic starchate so formed by mixing it with an aqueous acid solution to produce by acid hydrolysis a 2,3,6-triorganic glucose; and etherifying the glucose so formed to produce a 2,3,4,5,6-pentaorganic glucose.

17. A process of producing a substantially uniformly substituted glucoside which comprises the steps of mixing starch with an alkali metal hydroxide selected from the class consisting of lithium hydroxide, sodium hydroxide, and potassium hydroxide dissolved in a nonaqueous alcoholic system at a temperature of from 80° C. to approximately 115° C. with the alkali hydroxide present in at least approximately stoichiometric quantities in relation to the starch to produce a 2-monoalkali starchate; reacting the 2-monoalkali starchate so produced by mixing it with an alkyl halide dispersed in a nonaqueous solvent at a temperature of from 80° C. to 118° C. to produce a 2-monoorganic starchate; reacting the 2-monoorganic starchate so produced with an alkali hydroxide selected from the class consisting of lithium hydroxide, sodium hydroxide, and potassium hydroxide dissolved in at least approximately stoichiometric quantities in a nonaqueous alcoholic system at a temperature in excess of 115° C. with provision for removal of water formed by the reaction to produce a 2-monoorganic, 3-monoalkali starchate; reacting the 2-monoorganic, 3-monoalkali starchate by mixing it with an alkyl halide dispersed in a non-aqueous solvent at a temperature of at least 115° C. to produce a 2,3-diorganic starchate; reacting the 2,3-diorganic starchate so formed by mixing it with an alkali metal selected from the class consisting of lithium, sodium and potassium dissolved in liquid ammonia with the alkali present in approximately stoichiometric quantities with the starchate to produce a 2,3-diorganic, 6-monoalkali starchate; reacting the diorganic monalkali starchate so formed by mixing it with an alkyl halide dispersed in a nonaqueous solvent at a temperature in the range of 80° C. to about 118° C. to produce a 2,3,6-triorganic starchate; and mixing the triorganic starchate so formed with an alcoholic acid solution to produce by glucosidic hydrolysis of the starchate a 2,3,6-triorganic glucoside.

18. A process of producing a substantially uniformly substituted glucose which comprises the steps of mixing starch with an alkali metal hydroxide selected from the class consisting of lithium hydroxide, sodium hydroxide, and potassium hydroxide dissolved in a nonaqueous alcoholic system at a temperature of from 80° C. to approximately 115° C. with the alkali hydroxide present in at least approximately stoichiometric quantities in relation to the starch to produce a 2-monoalkali starchate; reacting the 2-monoalkali starchate so produced by mixing it with an alkyl halide dispersed in a nonaqueous solvent at a temperature of from 80° C. to 118° C. to produce a 2-monoorganic starchate; reacting the 2-monoorganic starchate so produced with an alkali hydroxide selected from the class consisting of lithium hydroxide, sodium hydroxide, and potassium hydroxide dissolved in at least approximately stoichiometric quantities in a nonaqueous alcoholic system at a temperature in excess of 115° C. with provision for removal of water formed by the reaction to produce a 2-monoorganic, 3-monoalkali starchate; reacting the 2-monoorganic, 3-monoalkali starchate by mixing it with an alkyl halide dispersed in a nonaqueous solvent at a temperature of at least 115° C. to produce a 2,3-diorganic starchate; reacting the 2,3-diorganic starchate so formed by mixing it with an alkali metal selected from the class consisting of lithium, sodium, and potassium dissolved in liquid ammonia with the alkali present in approximately stoichiometric quantities with the starchate to produce a 2,3-diorganic, 6-monoalkali starchate; reacting the diorganic monoalkali starchate so formed by mixing it with an alkyl halide dispersed in a nonaqueous solvent at a temperature in the range of 80° C. to 118° C. to produce a 2,3,6-triorganic starchate; and mixing the triorganic starchate so formed with an aqueous acid solution to produce by acid hydrolysis of the starchate a 2,3,6-triorganic glucose.

19. A process of producing a substantially uniformly substituted polyalkyl glucoside which comprises the steps of reacting starch by mixing it with an alkali metal hydroxide selected from the class consisting of lithium hydroxide, sodium hydroxide, and potassium hydroxide in a substantially nonaqueous alcoholic system at a temperature in the range of from 80° C. to 115° C. with the alkali hydroxide supplied in at least stoichiometric quantities to cause a reaction to produce a 2-alkali starchate; reacting the alkali starchate by mixing it with an alkyl halide dispersed in a nonaqueous solvent at a temperature in the range of 80° C. to about 118° C. to produce a monoalkyl starchate; reacting the monoalkyl starchate by mixing it with an alkali metal hydroxide selected from the class consisting of lithium hydroxide, sodium hydroxide and potassium hydroxide in a substantially nonaqueous alcoholic system at a temperature in the range of from 115° C. to 118° C. with the alkali hydroxide supplied in at least stoichiometric quantities to cause a reaction to produce a mixed alkyl alkali starchate; reacting the mixed alkyl alkali starchate by mixing it with an alkyl halide dispersed in a nonaqueous solvent at a temperature in the range of 80° C. to about 115° C. to produce a dialkyl starchate; subjecting the dialkyl starchate so formed to glucosidic hydrolysis by mixing it with a solution of an alkyl alcohol and an acid to produce an α-alkyl glucoside.

20. A process of preparing a substantially uniformly substituted polyorganic glucoside which comprises the steps of reacting starch by mixing it with an alkali metal hydroxide selected from the class consisting of lithium hydroxide, sodium hydroxide, and potassium hydroxide in a substantially nonaqueous alcoholic system at a temperature in the range of from 80° C. to 115° C. with the alkali hydroxide supplied in at least stoichiometric quantities to cause a reaction to produce an alkali starchate; reacting the alkali starchate by mixing it with an alkyl halide dispersed in a nonaqueous solvent at a temperature in the range of 80° C. to about 115° C. to produce a 2-monoalkyl starchate; reacting the 2-monoalkyl starchate by mixing it with an alkali metal hydroxide selected from the class consisting of lithium hydroxide, sodium hydroxide and potassium hydroxide in a substantially nonaqueous alcoholic system at a temperature in the range of from 115° C. to 118° C. with the alkali hydroxide supplied in at least stoichiometric quantities to cause a reaction to produce a 2-alkyl, 3-alkali starchate; reacting the 2-alkyl, 3-alkali starchate by mixing it with an alkyl halide dispersed in a nonaqueous solvent at a temperature in the range of 80° C. to about 118° C. to produce a dialkyl starchate; and subjecting the dialkyl starchate so formed to glucosidic hydrolysis by mixing a solution of an aryl alcohol and an acid therewith to produce an α-aryl glucoside.

21. A process of producing a substantially uniformly substituted polyorganic glucoside which comprises the steps of reacting starch by mixing it with an alkali metal hydroxide selected from the class consisting of lithium hydroxide, sodium hydroxide, and potassium hydroxide in a substantially nonaqueous alcoholic system at a temperature in the range of 80° C. to 115° C. with the alkali hydroxide supplied in at least stoichiometric quantities to cause a reaction to produce a 2-monoalkali metal starchate; reacting the 2-monoalkali metal starchate by mixing it with an alkyl halide dispersed in a nonaqueous solvent at a temperature in the range of 80° C. to about 118° C. to produce a monoalkyl starchate; reacting the monoalkyl starchate by mixing it with an alkali metal hydroxide selected from the class consisting of lithium hydroxide, sodium hydroxide and potassium hydroxide in a substantially nonaqueous alcoholic system at a temperature in the range of from 115° C. to 118° C. with the alkali hydroxide supplied in at least stoichiometric quantities to cause a reaction to produce a mixed 2-alkyl,3-alkali starchate; reacting the mixed alkyl alkali starchate by mixing it with an alkyl halide dispersed in a nonaqueous solvent at a temperature in the range of 80° C. to about 115° C. to produce a dialkyl starchate; subjecting the dialkyl starchate so formed to glucosidic hydrolysis by mixing a solution of an aralkyl alcohol and an acid therewith to produce an α-alkyl organic glucoside.

22. A process of producing substantially uniformly substituted 2,3,6-trisubstituted glucopyranose polymer which comprises the steps of mixing glucopyranose polymer with alkali metal hydroxide dissolved in a substantially nonaqueous alcoholic system in which the alcohol boils at a temperature above 78° C. at 760 mm. pressure at a temperature in the range of from 80° C. to approximately 115° C. with the alkali hydroxide being supplied in at least approximately stoichiometric quantities in relation to the glucopyranose polymer to cause a reaction to replace uniformly the hydrogen atoms of the hydroxyl groups on the carbon atoms next adjacent to the No. 1 carbon of substantially all of the glucopyranose polymer units which comprise the glucopyranose polymer molecules by the metal of said metal hydroxide to produce a substantially uniformly substituted 2-mono-alkali metal glucopyranose polymer; subsequently etherifying the glucopyranose polymer so formed by mixing it in a nonaqueous solvent at a temperature of from 80° C. to about 115° C. with an ethereal salt dissociatable at a temperature of approximately 80° C. to 115° C. in a nonaqueous system to substitute organic radicals in place of the metal atoms and form a substantially uniformly substituted 2-monoorganic glucopyranose polymer; and subsequently mixing the uniformly substituted 2-monoorganic glucopyranose polymer so formed with alkali metal hydroxide at a temperature in the range of approximately 115° C. to 118° C. with provision for removal of water formed by the reaction to produce a 2-monoorganic, 3-monoalkali glucopyranose polymer; reacting the 2-monoorganic, 3-alkali glucopyranose polymer so formed in a nonaqueous system at a temperature in the range of approximately 80° C. to 115° C. with an ethereal salt dissociatable in a nonaqueous system at a temperature in the range of approximately 80° C. to 115° C. to produce a 2,3-diorganic glucopyranose polymer; reacting the 2,3-diorganic glucopyranose polymer so formed by mixing it with a solution of an alkali metal dissolved in ammonia with the alkali present in approximately stoichiometric quantities to produce a 2,3-diorganic, 6-monoalkali glucopyranose polymer; and reacting the diorganic monoalkali glucopyranose polymer so formed by mixing it in a nonaqueous system with salt dissociatable in a nonaqueous system and selected from the group consisting of ethereal salt, non-metal salts, and metal salts other than salt of alkali metal and of ammonia, to produce a 2,3,6-trisubstituted polymer.

23. A process of producing a substantially uniformly substituted 2,3-diorganic glucopyranose polymer which comprises the steps of mixing glucopyranose polymer with alkali metal hydroxide at a temperature in the range of approximately 80° C. to 115° C. in a substantially nonaqueous alcoholic system in which the alcohol boils at a temperature above 78° C. at 760 mm. pressure with the alkali hydroxide supplied in at least stoichiometric quantities to cause a reaction to form a 2-monoalkali glucopyranose polymer; etherifying the 2-monoalkali metal glucopyranose polymer by mixing it in a nonaqueous system with an ethereal salt dissociatable at a temperature in the range of from 80° C. to about 115° C. to substitute organic groups in place of the metal groups to form a substantially uniformly substituted 2-monoorganic glucopyranose polymer; reacting the 2-monoorganic glucopyranose polymer so produced with alkali metal hydroxide in a substantially nonaqueous alcoholic system in which the alcohol boils above 78° C. at 760 mm. pressure at a temperature in the range of approximately 115° C. to 118° C. with provision for the removal of water formed by the reaction to produce a 2-monoorganic, 3-monoalkali glucopyranose polymer; and reacting the 2-monoorganic, 3-monoalkali glucopyranose polymer in a nonaqueous system at a temperature in the range of approximately 80° C. to 115° C. with an ethereal salt dissociatable in a nonaqueous system at a temperature in the range of approximately 80° C. to 115° C. to produce a 2,3-diorganic glucopyranose polymer.

24. A process of preparing a substantially uniformly substituted 2-monoorganic, 3-monoalkali glucopyranose polymer in which the positions of the organic and alkali groups are accurately known comprising in combination the steps of substituting an alkali metal in place of the hydrogen atom of one of the hydroxyl groups of each of substantially all of the various units comprising the glucopyranose polymer molecule by mixing glucopyranose polymer with alkali metal hydroxide at a temperature in the range of approximately 80° C. to 115° C. in a substantially nonaqueous alcoholic system in which the alcohol boils at a temperature above 78° C. at 760 mm. pressure with the alkali hydroxide supplied in at least stoichiometric quantities to cause a reaction to produce a 2-monoalkali metal glucopyranose polymer; selectively etherifying the 2-monoalkali metal glucopyranose polymer so formed by replacing the metallic elements selectively with etherifying agents by mixing it in a nonaqueous system with an ethereal salt dissociatable at a temperature in the range of 80° C. to about 115° C. in a nonaqueous system to produce a 2-monoorganic glucopyranose polymer; and reacting the 2-monoorganic glucopyranose polymer so produced with alkali metal hydroxide in a nonaqueous alcoholic system in which the alcohol boils at a temperature above 78° C. at 760 mm. pressure, at a temperature in the range of approximately 115° C. to about 118° C. with provision for removal of water formed by the reaction to produce a 2-monoorganic, 3-monoalkali glucopyranose polymer.

KENNETH M. GAVER.
ESTHER P. LASURE.
DERK V. TIESZEN.

REFERENCES CITED

The following references are of record in the file of this patent:

UNITED STATES PATENTS

| Number | Name | Date |
| --- | --- | --- |
| 1,350,820 | Lilienfeld | Aug. 24, 1920 |
| 1,863,208 | Schorger | June 14, 1932 |
| 2,157,083 | Peterson | May 2, 1939 |
| 2,235,783 | White | Mar. 18, 1941 |
| 2,258,168 | White | Oct. 7, 1941 |
| 2,258,171 | Barry | Oct. 7, 1941 |
| 2,294,924 | Miller et al. | Sept. 8, 1942 |
| 2,294,925 | Miller et al. | Sept. 8, 1942 |
| 2,389,771 | Gaver | Nov. 27, 1945 |
| 2,397,732 | Gaver | Apr. 2, 1946 |
| 2,405,973 | Nichols | Aug. 20, 1946 |

OTHER REFERENCES

Bertzweiller et al.: J. Am. Chem. Soc., vol. 65 (1943), pages 2367–2368.